US012094075B2

(12) United States Patent
Lee et al.

(10) Patent No.: US 12,094,075 B2
(45) Date of Patent: Sep. 17, 2024

(54) ELECTRONIC DEVICE GENERATING IMAGE AND METHOD FOR OPERATING THE SAME

(71) Applicant: Samsung Electronics Co., Ltd., Suwon-si (KR)

(72) Inventors: Sanghun Lee, Suwon-si (KR); Sungoh Kim, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 17/873,756

(22) Filed: Jul. 26, 2022

(65) Prior Publication Data

US 2023/0022444 A1  Jan. 26, 2023

Related U.S. Application Data

(63) Continuation of application No. PCT/KR2022/005066, filed on Apr. 7, 2022.

(30) Foreign Application Priority Data

Jul. 26, 2021  (KR) ........................ 10-2021-0097762

(51) Int. Cl.
*G06T 3/16* (2024.01)
*H04N 5/265* (2006.01)
(Continued)

(52) U.S. Cl.
CPC ............... *G06T 3/16* (2024.01); *H04N 5/265* (2013.01); *H04N 23/6811* (2023.01);
(Continued)

(58) Field of Classification Search
None
See application file for complete search history.

(56) References Cited

U.S. PATENT DOCUMENTS

2010/0045815 A1* 2/2010 Tsuchiya .............. H04N 23/698
382/209
2011/0096143 A1   4/2011 Ono
(Continued)

FOREIGN PATENT DOCUMENTS

CN  109997350 A  *  7/2019  .......... G06K 9/2054
JP  2011/097246 A     5/2011
(Continued)

OTHER PUBLICATIONS

English translation of JP-6788094-B2,Kawaguchi, Nov. 2020 (Year: 2020).*
(Continued)

*Primary Examiner* — James M Hannett
(74) *Attorney, Agent, or Firm* — Jefferson IP Law, LLP

(57) ABSTRACT

An electronic device is provided. The electronic device includes at least one processor, and a memory functionally connected to the at least one processor. The memory may store instructions that, when executed, enable the electronic device to obtain a plurality of images, generate a first basic extended image based on first images among the plurality of images, identify at least one first masking area included in the first basic extended image, and generate a first inference image by modifying the at least one first masking area using at least one first inference result, based on the first images and the first basic extended image. An angle of view of the first inference image may be larger than an angle of view of each of the first images.

20 Claims, 17 Drawing Sheets

(51) Int. Cl.
  *H04N 23/68*  (2023.01)
  *H04N 23/951*  (2023.01)

(52) U.S. Cl.
  CPC ....... *H04N 23/6812* (2023.01); *H04N 23/683* (2023.01); *H04N 23/951* (2023.01)

(56) References Cited

U.S. PATENT DOCUMENTS

| | | |
|---|---|---|
| 2013/0182184 A1 | 7/2013 | Senlet et al. |
| 2013/0329002 A1 | 12/2013 | Tico |
| 2014/0362173 A1 | 12/2014 | Doepke et al. |
| 2016/0044241 A1 | 2/2016 | Kaida |
| 2016/0050368 A1 | 2/2016 | Seo et al. |
| 2016/0286138 A1 | 9/2016 | Kim |
| 2017/0034410 A1 | 2/2017 | Yoo et al. |
| 2017/0116709 A1 | 4/2017 | Wang et al. |
| 2017/0237901 A1 | 8/2017 | Lee et al. |
| 2018/0227487 A1 | 8/2018 | Heo et al. |
| 2018/0336666 A1* | 11/2018 | Kim ........................... G06T 5/50 |
| 2019/0045099 A1* | 2/2019 | Lee .................... H04N 23/6815 |
| 2020/0202576 A1 | 6/2020 | Lee et al. |
| 2021/0377457 A1* | 12/2021 | Kobayashi ................ G06T 5/77 |
| 2022/0180475 A1 | 6/2022 | Miyashita et al. |

FOREIGN PATENT DOCUMENTS

| | | | | |
|---|---|---|---|---|
| JP | 2015207809 A | * | 11/2015 | |
| JP | 2016/039598 A | | 3/2016 | |
| JP | 2020/154694 A | | 9/2020 | |
| JP | 2020-182045 A | | 11/2020 | |
| JP | 6788094 B2 | * | 11/2020 | ........... B64C 39/024 |
| KR | 10-2014-0110624 A | | 9/2014 | |
| KR | 10-2016-0021501 A | | 2/2016 | |
| KR | 10-2016-0115466 A | | 10/2016 | |
| KR | 10-1741699 B1 | | 5/2017 | |
| KR | 10-2017-0096459 A | | 8/2017 | |
| KR | 10-2018-0091359 A | | 8/2018 | |
| KR | 10-2019-0134217 A | | 12/2019 | |
| KR | 10-2020-0081527 A | | 7/2020 | |

OTHER PUBLICATIONS

English translation of JP-2015207809-A, Shinoda, Nov. 2015 (Year: 2015).*

English translation of CN-109997350-A, Kobayashi, Jul. 2019 (Year: 2019).*

International Search Report dated Jul. 13, 2022 issued in International Patent Application No. PCT/KR2022/005066.

* cited by examiner

ELECTRONIC DEVICE GENERATING IMAGE AND METHOD FOR OPERATING THE SAME

CROSS-REFERENCE TO RELATED APPLICATION(S)

This application is a continuation application, claiming priority under § 365(c), of an International application No. PCT/KR2022/005066, filed on Apr. 7, 2022, which is based on and claims the benefit of a Korean patent application number 10-2021-0097762, filed on Jul. 26, 2021, in the Korean Intellectual Property Office, the disclosure of which is incorporated by reference herein in its entirety.

TECHNICAL FIELD

The disclosure relates to an electronic device generating an image and a method for operating the same.

BACKGROUND ART

In general, an electronic device may obtain an image limited to the focal length and range of the angle of view of the shooting lens. Panorama shooting may create an image with a wide angle of view by stitching several images shot at different shooting angles.

Conventional panorama shooting is a technique of stitching several still images with different shooting points of gaze. If the subject moves or the shooter moves so that the electronic device causes a displacement, undesired artifacts may occur, resulting in frequent reshooting until a desired image is obtained. Further, panorama shooting does not give a satisfactory result without keeping the height and the progress direction and speed constant. Moreover, it is impossible to create a video with a wide angle of view by stitching still images.

The above information is presented as background information only to assist with an understanding of the disclosure. No determination has been made, and no assertion is made, as to whether any of the above might be applicable as prior art with regard to the disclosure.

DISCLOSURE

Technical Problem

Dynamic panorama shooting has been proposed as a method for generating a video with a wide angle of view. By this method, however, only an area in the angle of view newly captured is updated while the rest remains unchanged. This essentially leads to an artifact if the shooter moves causing a displacement of the electronic device. In other words, dynamic panorama shooting is applicable only when the shooter conducts photographing while turning in one direction from a fixed position.

Aspects of the disclosure are to address at least the above-mentioned problems and/or disadvantages and to provide at least the advantages described below. Accordingly, an aspect of the disclosure is to provide a method for generating an image with an extended angle of view from an image captured by a user and an electronic device therefor.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes at least one processor, and a memory functionally connected to the at least one processor. The memory may store instructions that, when executed, enable the electronic device to obtain a plurality of images, generate a first basic extended image based on first images among the plurality of images, identify at least one first masking area included in the first basic extended image, and generate a first inference image by modifying the at least one first masking area using at least one first inference result, based on the first images and the first basic extended image. An angle of view of the first inference image may be larger than an angle of view of each of the first images.

In accordance with another aspect of the disclosure, an electronic device is provided. The electronic device includes at least one camera and at least one processor operably connected with the at least one camera, wherein the at least one processor is configured to obtain a plurality of images using the at least one camera, stabilize the plurality of images using a stabilization algorithm, generate a plurality of basic extended images by overlaying some images of the plurality of stabilized images, generate a plurality of inference images resultant from modifying the plurality of basic extended images using an inference model, and generate a final video with a larger angle of view than an angle of view of each of the plurality of images, based on the plurality of inference images.

Advantageous Effects

According to various embodiments, an electronic device generating an image and a method for operating the same are provided. Thus, it is possible to generate an image in a wider range than the angle of view of the shooting lens of the electronic device and to crop part of the image to thereby obtain an image focusing primarily on a desired designated object or a figure. It is also possible to reduce image shakes that arise due to movement of a device when gripped or with an unstable fixing device.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
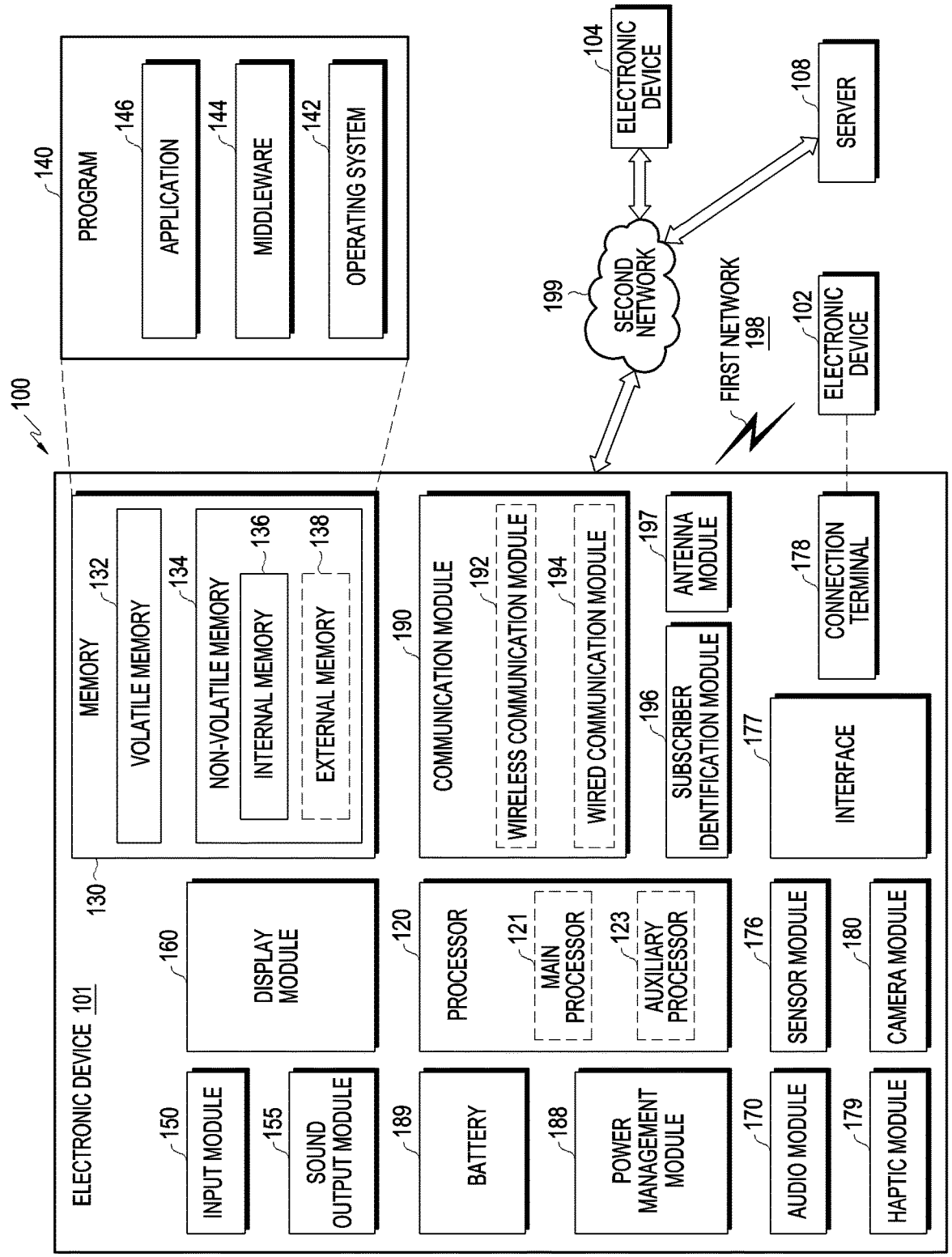
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module (or display) 160, an audio module 170, a sensor module 176, an interface 177, a connecting (or connection) terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, Wi-Fi direct, or infrared data association (IrDA)) or a second network 199 (e.g., a long-range communication network, such as a legacy cellular network, a 5th generation (5G) network, a next-generation communication network, the Internet, or a computer network (e.g., local area network (LAN) or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
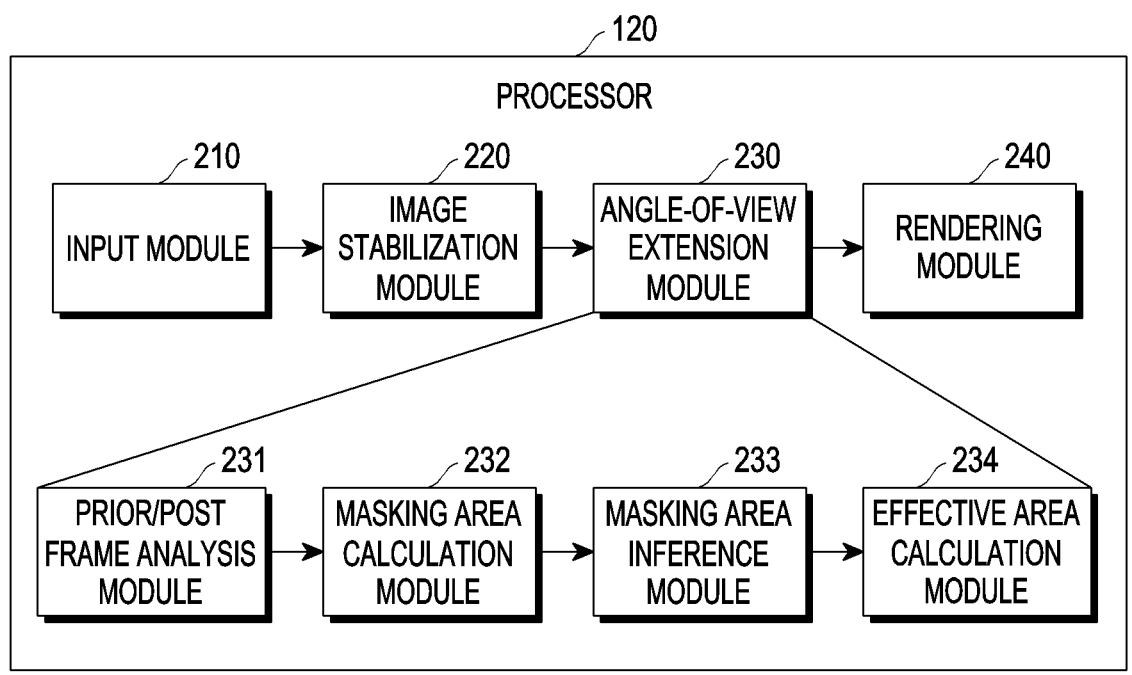
FIG. 2 is a view illustrating a configuration of a processor of an electronic device according to an embodiment of the disclosure.

FIG. 2 is a view illustrating a configuration of a processor of an electronic device according to an embodiment of the disclosure.

Referring to FIG. 2, according to an embodiment, the operation of the processor 120 of the electronic device 101 may be understood as the operation of each module illustrated in FIG. 2. For example, that the processor 120 of the electronic device 101 performs a designated operation may mean that the processor 120 controls a designated component (e.g., each module disclosed in FIG. 2) of the electronic device 101 to perform the designated operation. For example, that the processor 120 of the electronic device 101 performs a designated operation may mean that the processor 120 controls another component of the electronic device 101 through a designated module (e.g., each module disclosed in FIG. 2) included in the processor 120 to perform the designated operation. For example, the memory (e.g., the memory 130 of FIG. 1) of the electronic device 101 may store instructions that, when executed, enable at least one processor (e.g., the processor 120 or a separate micro controller unit (MCU) (not shown)) to perform the designated operation.

Although FIG. 2 illustrates that a plurality of modules (e.g., the input module 210, the image stabilization module 220, the angle-of-view extension module 230, a before-after (or prior/post) frame analysis module 231, a masking area calculation module 232, a masking area inference module 233, an effective area calculation module 234, and a rendering module 240) are included in one processor (e.g., the processor 120), this is merely an example. According to an embodiment, at least some of the plurality of modules disclosed in FIG. 2 may be included in a first processor (e.g., the processor 120), and at least others of the plurality of modules may be included in a second processor (e.g., a separate micro controller unit (MCU) (not shown)).

Although FIG. 2 discloses that the processor 120 includes a plurality of modules, this is merely an example. The plurality of modules may be understood as a concept adopted to describe a plurality of operations performed by the processor 120. For example, the processor 120 may mean a control circuit controlling the plurality of modules, described below, to operate. For example, at least some of the operations of the plurality of modules described below may be controlled by one processor (e.g., the processor 120 and/or a separate MCU (not shown)), and at least others of the operations of the plurality of modules may be independently performed, rather than controlled by at least one processor (e.g., the processor 120 and/or a separate MCU (not shown)).

In description of each embodiment below, "image" may mean a single image or several successive images. For example, generating an image may mean generating a single image or generating several successive images. For example, capturing an image by the electronic device 101 may be represented as generating a plurality of original images by the electronic device 101.

In general, "angle of view" means an angle in which a camera may capture an image through a lens. For example, depending on angles of view, lenses may be divided into wide-angle lenses (e.g., lenses with an angle of view of 60 degrees or more), standard lenses (e.g., lenses with an angle of view between 30 degrees and 60 degrees), or telescopic lenses (e.g., lenses with an angle of view of 30 degrees or less).

However, for convenience of description, "angle of view of an image" is defined as follows.

In description of each embodiment below, "image with an extended angle of view (or extended image)" or "video with an extended angle of view (or extended video)" may mean an image or video resultant from naturally synthesizing information about an area falling outside the range of the angle of view at the time of capturing by the camera used for capturing based on at least one of prior, current, or post frame information. For example, that the angle of view of a first image is larger than the angle of view of a second image may mean that the first image includes information about an area not included in the second image. For example, in the case of common panorama shooting, a panorama image created by sequentially stitching several images may be an image with an extended angle of view, as compared with each of the images used for synthesizing the panorama image. For example, when a first image, which is a panorama image, is generated by synthesizing a second image and a third image, the first image may include information about an area not included in the second image but included in the third image and information about an area not included in the third image but included in the second image. Thus, the angle of view of the first image may be larger than the angle of view of the second image and the angle of view of the third image. The panorama image may include the summation of the information included in each of the images used for synthesizing the panorama image, as maximum information. However, as described below, according to various embodiments, the image with the extended angle of view may include information other than the information included in each of the images used for synthesizing the image with the extended angle of view.

It will be appreciated by one of ordinary skill in the art that the meaning of the angle of view of image is not limited to those described above, but may be interpreted as in various embodiments described below in light of the common knowledge in the relevant field.

The operation of each module disclosed in FIG. 2 is described below.

As described above, that a designated module may perform a designated operation may mean that the electronic device 101 (e.g., the processor 120 and/or a separate MCU (not shown)) may perform the designated operation.

According to an embodiment, the input module 210 may receive an original image as captured. The original image may be an image captured by the electronic device 101 or an image received from an external device or an external server. According to an embodiment, the input module 210 may receive sensor information obtained along with the time when the original image is captured. For example, the input module 210 may receive sensor information (e.g., acceleration sensor information, gyro sensor information, or geomagnetic sensor information) including information about the position and/or movement of the device (e.g., the electronic device 101 or an external device (not shown)) which has captured the original image.

According to an embodiment, the image stabilization module 220 may analyze the original image to identify the moving path of the device (e.g., the electronic device 101 or an external device (not shown)) having captured the original image. For example, the image stabilization module 220 may identify the moving path of the device having captured the original image by extracting and analyzing feature points from a plurality of original images. The feature point may mean a designated area commonly included in a plurality of original images or a designated object commonly included in the plurality of original images. According to another embodiment, the image stabilization module 220 may identify the moving path of the device having captured the original image, based on sensing information about the movement and/or position of the device having captured the original image (e.g., the electronic device 101 or an external device (not shown)). Or, according to another embodiment, the image stabilization module 220 may identify the moving path of the device having captured the original image, based on sensing information about the position and/or movement of the device having captured the original image and a result of analyzing the original image. According to various embodiments, the image stabilization module 220 may stabilize a plurality of images using a stabilization algorithm. For example, the image stabilization module 220 may reduce image shakes caused by a movement of the device having captured the image by removing unnecessary shakes of the original image or smoothening the path, based on the moving path of the device having captured the original image. For example, the image stabilization module 220 may calculate a warping matrix necessary to render a stabilized image based on the moving path of the device having captured the original image. The warping matrix is information used for the operation of obtaining an image with a stabilized moving path of the camera from the original image and may be used for video rendering in a normal video stabilization operation. For example, the image stabilization module 220 may calculate a variation between adjacent frames by comparing the respective feature points of the frames of the original image or using the sensor information obtained along with the original image. For example, the variation between adjacent frames may include a displacement in three-dimensional (3D) space, degree of rotation on 3 axes, and/or the magnification of the camera lens. For example, the variation between adjacent frames may be represented as a matrix in a size of 3×3 or 4×4. For example, the image stabilization module 220 may remove points where the value is instantaneously changed significantly using a random sample consensus (RANSAC) algorithm in an objected matrix set and may obtain a warping matrix necessary for video stabilization using a regression analysis and/or deep learning-type smooth path conjecturing algorithm.

According to an embodiment, the angle-of-view extension module 230 may include the prior/post frame analysis module 231, the masking area calculation module 232, the masking area inference module 233, and/or the effective area calculation module 234.

According to an embodiment, the prior/post frame analysis module 231 may determine the degree of extension of the angle of view of the image. For example, the prior/post frame analysis module 231 may determine to generate an image with a preset size of angle of view. As another example, the prior/post frame analysis module 231 may determine the size of the angle of view of the extended image based on the size (or angle of view) of the images used for extending the angle of view. According to an embodiment, the prior/post frame analysis module 231 may primarily generate an image with the extended angle of view by overlaying basic frames (e.g., the current frame and prior/post frames) based on the determined degree of extension of angle of view. An image with the extended angle of view, generated by the prior/post frame analysis module 231, may be referred to as a basic extended image, and the image used to generate the basic extended image may be referred to as a basic image. For example, the prior/post frame analysis module 231 may generate a first basic extended image by overlaying a reference frame (e.g., a second frame) and prior/post frames (e.g., a first frame and a third frame) based on the determined degree of extension of angle of view. The number of basic images used to generate the basic extended image is not limited, and a method for determining the number of basic images used to generate a basic extended image is described below. According to an embodiment, the basic extended image may include a "hole" that means an area free of image information. According to an embodiment, the prior/post frame analysis module 231 may detect an object quickly moving by comparing a plurality of frames and detecting the position of an artifact that may result therefrom. The artifact may mean an object that is unnatural portion or an unnaturally expressed object in the image. For example, in a case where a quickly moving object (e.g., a baseball) is in a plurality of frames as a result of analyzing the plurality of frames, during the process of generating a basic extended image by overlaying the plurality of frames, the baseball which was be in a first position at the moment when the first frame is generated is moved to a second position which is far away from the first position at the moment when the second frame is generated so that the baseball may be represented as simultaneously existing in the first position and the second position in the basic extended image generated from the first frame and the second frame, and in this case, the baseball or the portion in which the baseball is represented may be named the artifact.

According to an embodiment, the masking area calculation module 232 may identify a masking area. For example, the masking area calculation module 232 may detect the position of the masking area. The masking area may mean an unnatural or incomplete area in the basic extended image generated in the prior/post frame analysis module 231. For example, the masking area may include the position of the artifact detected by the prior/post frame analysis module 231, the boundary between the plurality of frames overlaid or a hole free of image information.

According to an embodiment, the masking area inference module 233 may derive a result of inference of modifying the masking area or replacing the masking area based on the basic image (e.g., the original image of the reference frame and the original image of the prior/post frames), basic extended image, and/or reference frame information. For example, the masking area inference module 233 may calculate the result of inference of modifying the masking area or replacing the masking area based on the basic image, basic extended image, and/or reference frame information. The reference frame information may mean information related to the basic image used to generate the basic extended image. For example, the reference frame information may include information about the number of basic images used to generate the basic extended image, the respective frame numbers of the basic images, what basic image information about a designated area in the basic extended image is included in, and/or information about an area not included in the basic image of the designated area in the basic extended image. For example, the reference frame information may include information about an image corresponding to each pixel included in the basic extended image among the basic images. According to an embodiment, the masking area inference module 233 may generate an inference image by modifying the basic extended image using the result of inference derived based on the basic images, basic extended image, and/or reference frame information. The inference image may mean an image in which the masking area is naturally modified as the basic extended image generated by the prior/post frame analysis module 231 is modified based on the result of inference by the masking area inference module 233. According to an embodiment, the masking area inference module 233 may use the result of output from a pre-trained deep learning network to generate the inference image. The pre-trained deep learning network may include multiple convolutional layers, and training the deep learning network is not limited to a specific method. The pre-trained deep learning network may be included in the electronic device 101 or may exist outside the electronic device 101. For example, the masking area inference module 233 may derive the result of inference using the deep learning network, based on the basic images, basic extended image, and/or reference frame information. For example, the masking area inference module 233 may calculate the result of inference using the deep learning network provided in the electronic device 101, based on the basic images, basic extended image, and/or reference frame information. Or, as another example, the masking area inference module 233 may receive the result of inference from the deep learning network provided in an external device (e.g., the electronic device 102 or the server 108 of FIG. 1) based on the basic images, basic extended image, and/or reference frame information, and using the deep learning network by the masking area inference module 233 is not limited to a specific method.

According to an embodiment, the effective area calculation module 234 may identify an area in which the result of calculation by the masking area inference module 233 has low reliability. For example, the effective area calculation module 234 may calculate the effective area so that the connection between the plurality of frames overlaid to generate the basic extended image is natural, by removing the low-inference reliability in the inference image. The effective area may mean an area appropriate for being included in the final image or final video. For example, the effective area may mean an area in which the inference reliability is a preset reference value or more in the area modified by the result of inference by the masking area inference module 233.

According to an embodiment, the rendering module 240 may render a final image (or final video) with an extended angle of view, based on the result of calculation of effective area and the result of inference of masking area obtained by the angle-of-view extension module 230.

Figure 3:
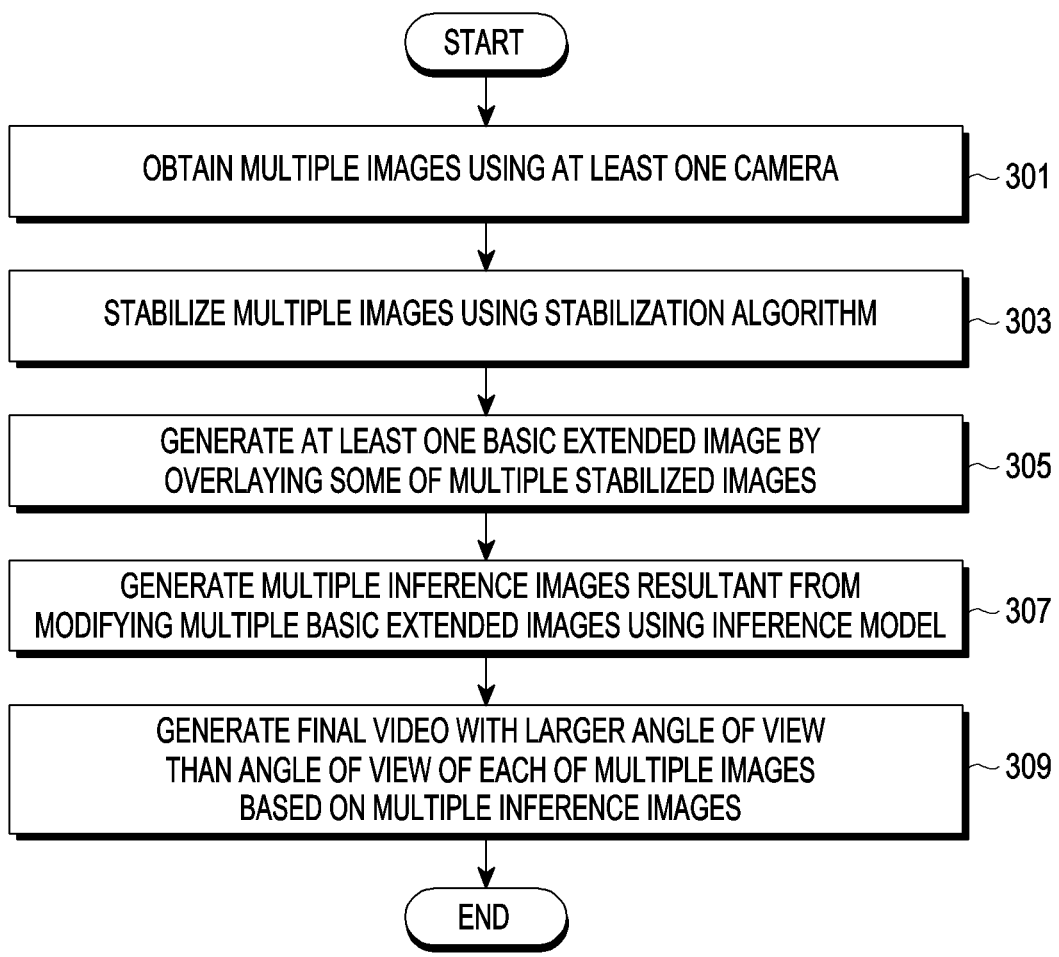
FIG. 3 is a flowchart illustrating operations of an electronic device according to an embodiment of the disclosure.

FIG. 3 is a flowchart illustrating operations of an electronic device according to an embodiment of the disclosure. FIG. 3 is described with reference to FIG. 4.

Figure 4:
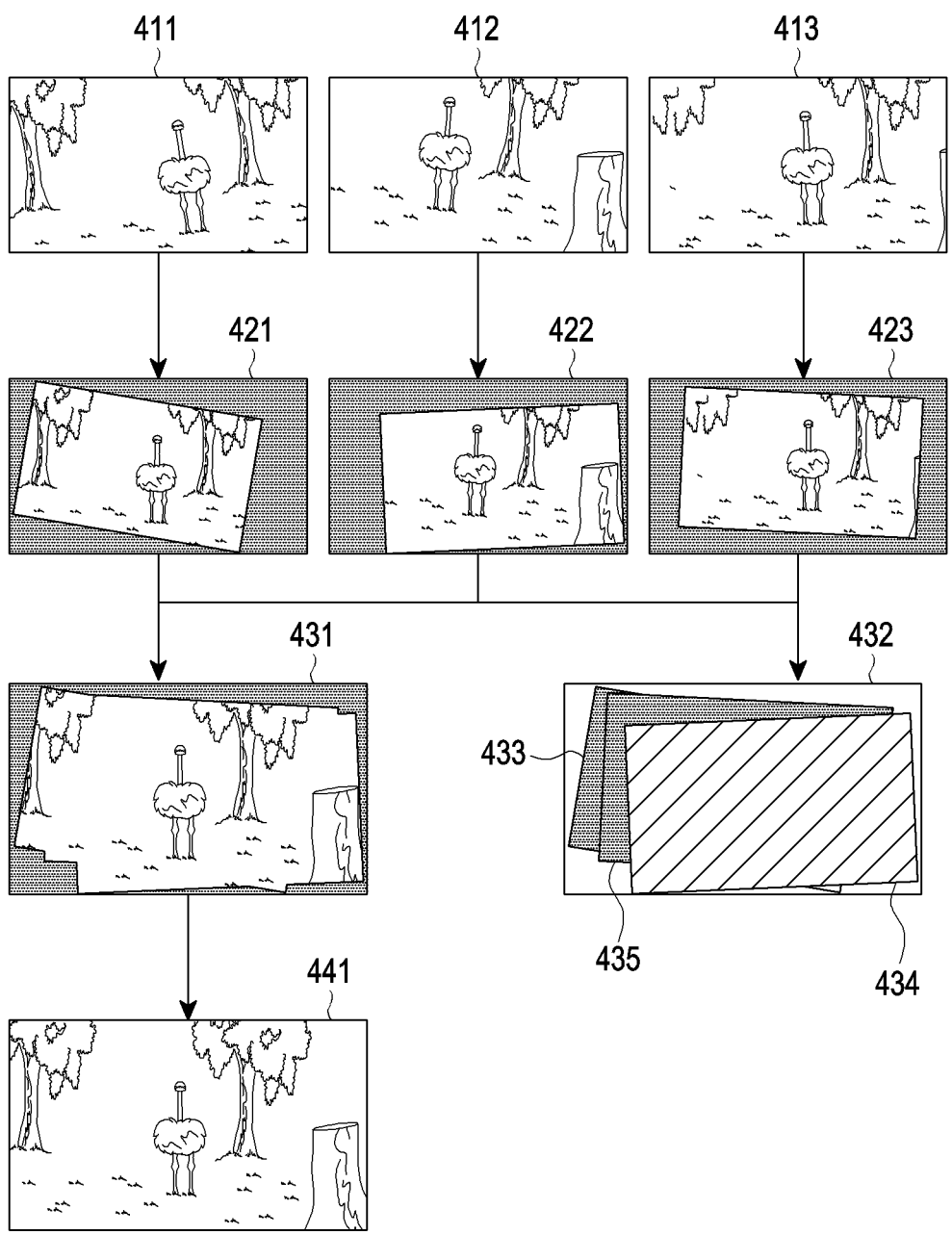
FIG. 4 is a view illustrating operations of an electronic device according to an embodiment of the disclosure.

FIG. 4 is a view illustrating an operation method of an electronic device according to an embodiment of the disclosure.

Referring to FIG. 3, in operation 301, according to various embodiments, an electronic device 101 (e.g., the processor 120 and/or a separate MCU (not shown)) may obtain a plurality of images. For example, the electronic device 101 may obtain a plurality of images using at least one camera (e.g., the camera module 180 of FIG. 1). For example, referring to FIG. 4, the electronic device 101 may obtain a first image 411 at a first time, obtain a second image 412 at a second time, and obtain a third image 413 at a third time. For example, the first image 411, second image 412, and third image 413 of FIG. 4 may be original images before stabilization, which contains shakes due to a movement of the electronic device 101 during image capturing. As another example, the electronic device 101 may obtain a plurality of images from an external device (e.g., the server 108 of FIG. 1 or the electronic device 102) through at least one communication module (e.g., the communication module 190 of FIG. 1). In this case, according to an implementation, the electronic device 101 may receive sensor information including information about the position and/or movement of the device having captured the plurality of images from the external device (e.g., the server 108 of FIG. 1 or the electronic device 102).

In operation 303, according to various embodiments, the electronic device 101 may stabilize the plurality of images using a stabilization algorithm. For example, referring to FIG. 4, the electronic device 101 may obtain a warping matrix based on, at least, the first image 411, the second image 412, and the third image 413. For example, the electronic device 101 may apply the warping matrix to the first image 411 (421), the warping matrix to the second image 412 (422), and the warping matrix to the third image 413 (423). According to an embodiment, the electronic device 101 may determine the degree of extension of angle of view based on, at least, the first image 411, the second image 412, and the third image 413. For example, in FIG. 4, the electronic device 101 may determine the degree of extension of angle of view based on a variation between adjacent frames (e.g., a displacement in 3D space, degree of rotation on 3 axes, and/or magnification of camera lens) of the first image 411, the second image 412, and the third image 413. As another example, in FIG. 4, the electronic device 101 may determine the degree of extension of the angle of view based on sensor information including information about the position and/or movement of the electronic device 101. As another example, in FIG. 4, the electronic device 101 may also determine the degree of extension of angle of view based on the sensor information including information about the position and/or movement of the electronic device 101 and the variation between adjacent frames of the first image 411, the second image 412, and the third image 413. For example, referring to FIG. 4, the electronic device 101 may apply the warping matrix to the first image 411, the second image 412, and the third image 413 based on, at least, the determined degree of extension of angle of view. For example, in FIG. 4, the size of the result (e.g., 421, 422, or 423) of applying the warping matrix may correspond to the determined degree of extension of angle of view.

Figure 9:
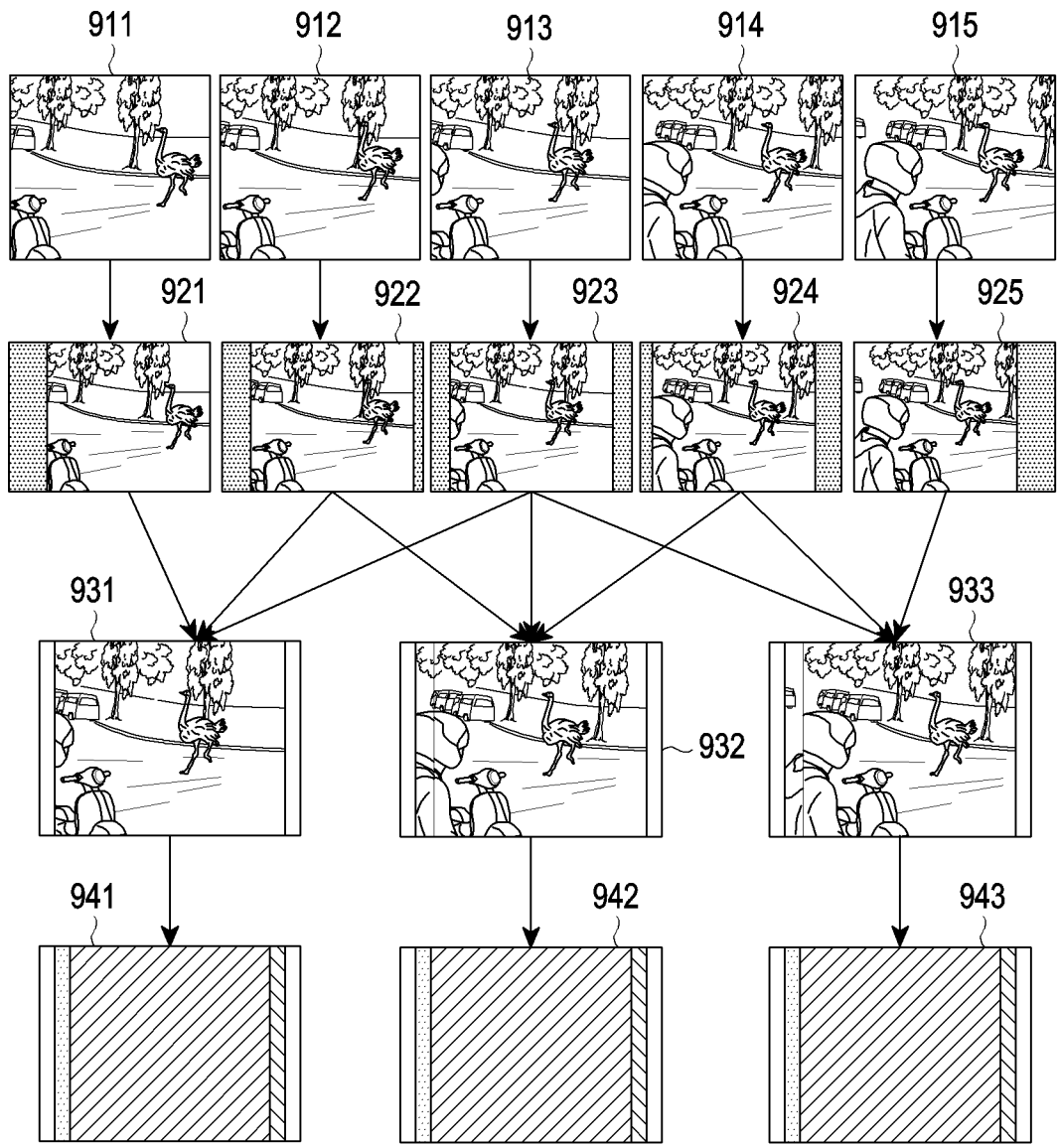
FIG. 9 is a view illustrating operations of an electronic device according to an embodiment of the disclosure.

In operation 305, according to various embodiments, the electronic device 101 may generate at least one basic extended image (e.g., the first basic extended image 431) by overlaying some images (e.g., 421, 422, and 423) among the plurality of stabilized images. Although FIG. 4 illustrates generating one basic extended image (e.g., the first basic extended image 431) by applying the warping matrix and overlaying three original images (e.g., the first image 411, the second image 412, and the third image 413), this is part of the whole process. Referring to FIG. 9 described below, it may be appreciated as the operation of generating a plurality of basic extended images by applying a stabilization algorithm to the plurality of images and overlaying some of the images. A process of generating one basic extended image is described in detail with reference to FIG. 4.

Referring to FIG. 4, according to an embodiment, the electronic device 101 may generate a first basic extended image 431 by overlaying a plurality of stabilized images (e.g., 421, 422, and 423). For example, the angle of view of the first basic extended image 431 may be larger than the angle of view of each of the first image 411, the second image 412, and the third image 413. Referring to FIG. 4, according to an embodiment, the electronic device 101 may identify reference frame information 432 corresponding to the first basic extended image 431. For example, the electronic device 101 may identify that in the first basic extended image 431, information about the first image 411 is included in a first area 433, information about the second image 412 is included in a second area 434, and information about the third image 413 is included in a third area 435. For example, the electronic device 101 may identify that during the process of generating the first basic extended image 431, three original images (e.g., the first image 411, the second image 412, and the third image 413) are used. For example, the electronic device 101 may identify an area free of image information (e.g., a hole area) from the first basic extended image 431. For example, the hole area may mean a set of pixels not including information about the pixels included in the basic images among the pixels in the basic extended image.

In operation 307, according to various embodiments, the electronic device 101 may generate a plurality of inference images using an inference model on a plurality of basic extended images. For example, referring to FIG. 4, the electronic device 101 may generate a first inference image 441 by applying the inference model to the first basic extended image 431. For example, the electronic device 101 may calculate a masking area of the first basic extended image 431 and generate the first inference image 441 based on a result of inference of replacing or modifying the masking area. For example, the angle of view of the first inference image 441 may be larger than the angle of view of each of the first image 411, the second image 412, and the third image 413. Although FIG. 4 illustrates generating one inference image (e.g., the first inference image 441) resultant from modifying one basic extended image (e.g., the first basic extended image 431) using the inference model, this is part of the whole process. The process of generating one inference model described in connection with FIG. 4 may be appreciated as the whole operation of generating a plurality of inference images.

In operation 309, according to various embodiments, the electronic device 101 may generate a final image with a larger angle of view than the angle of view of each of the plurality of basic images (e.g., the first image 411, the second image 412, and the third image 413) based on the plurality of inference images (e.g., the plurality of inference images including the first inference image 441). For example, since the plurality of inference images including the first inference image 441 have larger angles of view than each of the basic images (e.g., the first image 411, the second image 412, and the third image 413) which are bases, as described above, the final image, which is generated by successively including the plurality of inference images including the first inference image 441, may have a larger angle of view than the angle of view of each of the basic images (e.g., the first image 411, the second image 412, and the third image 413).

Figure 5:
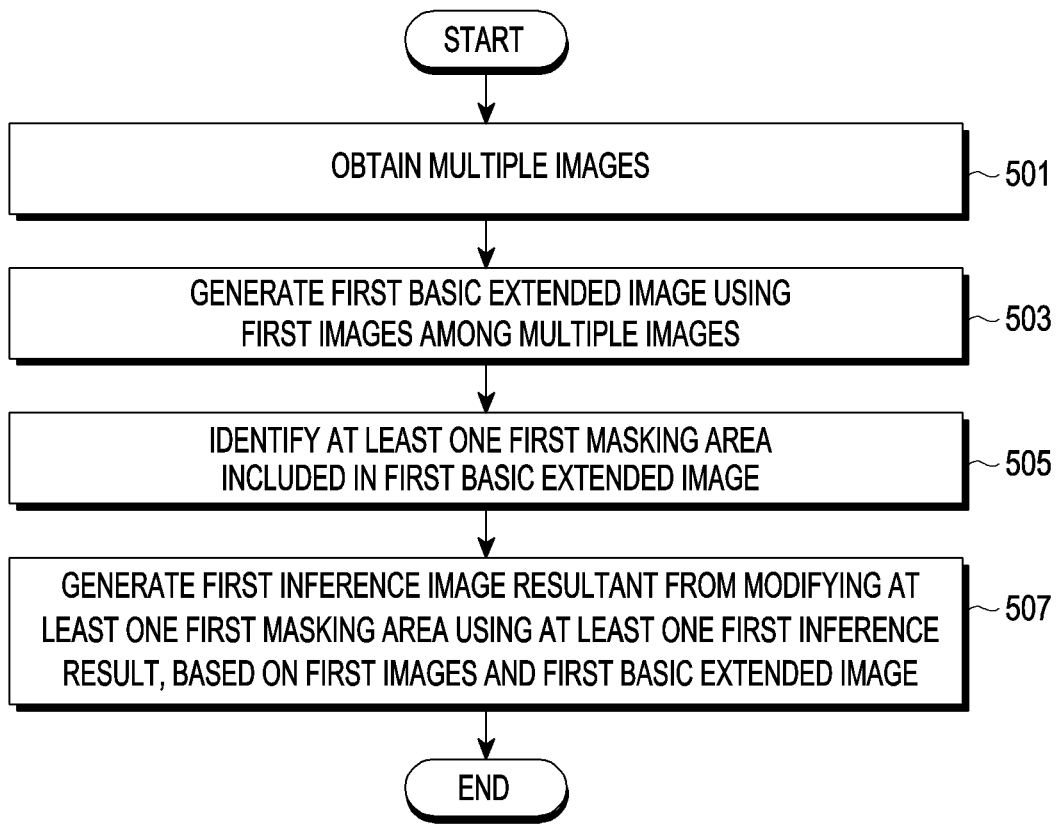
FIG. 5 is a flowchart illustrating operations of an electronic device according to an embodiment of the disclosure.

FIG. 5 is a flowchart illustrating operations of an electronic device according to an embodiment of the disclosure. FIG. 5 is described with reference to FIGS. 6 and 7.

Figure 6:
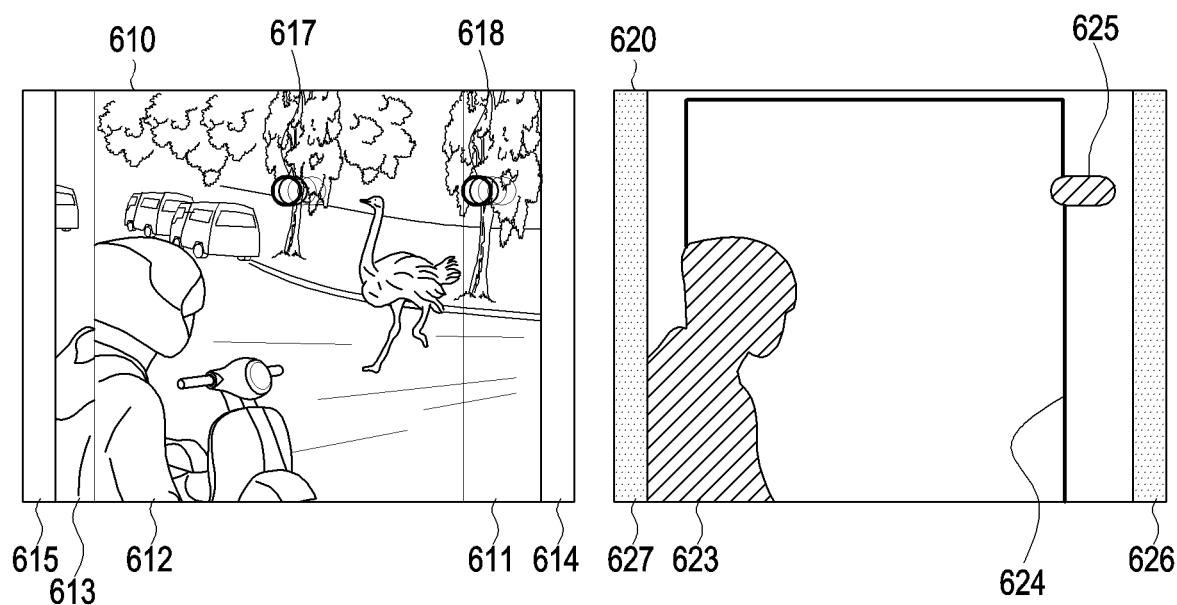
FIG. 6 is a view illustrating operations of an electronic device according to an embodiment of the disclosure.

FIG. 6 is a view illustrating operations of an electronic device according to an embodiment of the disclosure.

Figure 7:
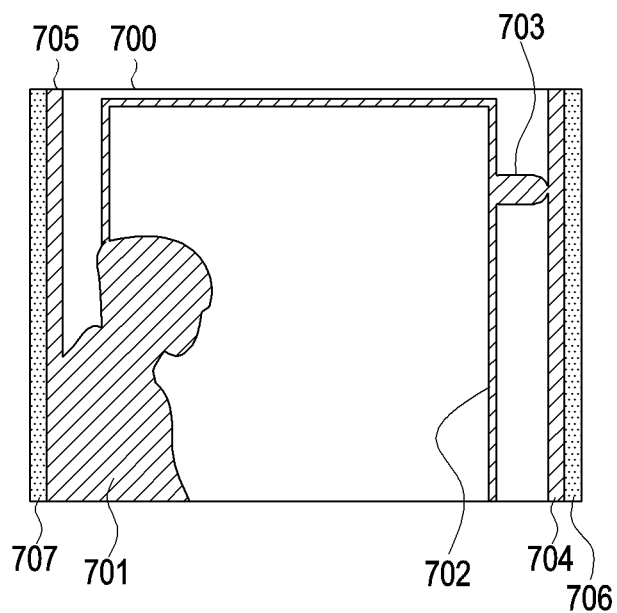
FIG. 7 is a view illustrating operations of an electronic device according to an embodiment of the disclosure.

FIG. 7 is a view illustrating operations of an electronic device according to an embodiment of the disclosure.

Referring to FIG. 5, in operation 501, according to various embodiments, an electronic device 101 (e.g., the processor 120 and/or a separate MCU (not shown)) may obtain a plurality of images.

In operation 503, according to various embodiments, the electronic device 101 may stabilize the plurality of images and generate a basic extended image using some images (e.g., first images) among the plurality of stabilized images. For example, referring to FIG. 6, the electronic device 101 may generate a first basic extended image 610 using a first image corresponding to a prior frame among the plurality of stabilized images, a second image corresponding to a reference frame, and a third image corresponding to a post frame. For example, the first basic extended image 610 may include an area 611 corresponding to the first image, an area 612 corresponding to the second image, and an area 613 corresponding to the third image. For example, the first basic extended image 610 may include areas (e.g., 614 and 615) not including image information. For example, the first basic extended image 610 may include a first object 618 (e.g., an object captured at a first time for a quickly moving baseball) located in a first position of the area 611 corresponding to the first image and a second object 617 (e.g., an object captured at a second time for a quickly moving baseball) located in a second position of the area 612 corresponding to the second image.

In operation 505, according to various embodiments, the electronic device 101 may identify at least one masking area included in the basic extended image. For example, referring to FIG. 6, the electronic device 101 may analyze (620) the first basic extended image 610, identifying artifacts, hole area, and/or boundary between a plurality of overlaid frames. For example, the electronic device 101 may identify hole areas (e.g., 626 and 627) as the masking area. For example, the electronic device 101 may identify the boundary area 624 where the plurality of images are unnaturally or incompletely overlaid as the masking area. For example, the electronic device 101 may identify the area corresponding to the inaccurately overlaid object 623 (e.g., a figure wearing a helmet) as the masking area. For example, among the first object 618 (e.g., an object captured at a first time for a quickly moving baseball) located in a first position of the area 611 corresponding to the first image and a second object 617 (e.g., an object captured at a second time for a quickly moving baseball) located in a second position of the area 612 corresponding to the second image, the electronic device 101 may recognize the second object 617 positioned in the area 612 corresponding to the second image corresponding to the reference frame, as an effective object, and identify the area 625 corresponding to the first object 618 positioned in the area 611 corresponding to the first image corresponding to the prior frame, as the masking area.

In operation 507, according to various embodiments, the electronic device 101 may generate an inference image resultant from modifying at least part of at least one masking area using at least one inference result, based on a basic extended image and basic images used to generate the basic extended image.

According to an embodiment, the electronic device 101 may determine the inference reliability of at least one area modified using the inference result from the inference image resultant from modifying at least part of at least one masking area using at least one inference result, thereby calculating the effective area. For example, the inference image 700 of FIG. 7 may include at least one area (e.g., 701, 702, 703, 704, 705, 706, and 707) in which at least one masking area has been modified using at least one inference result. The at least one modified area (e.g., 701, 702, 703, 704, 705, 706, and 707) included in the inference image 700 of FIG. 7 may be areas in which the masking areas (e.g., 623, 624, 625, 626, and 627) of FIG. 6 have been modified using at least one inference result.

According to an embodiment, referring to FIG. 7, the electronic device 101 may determine the inference reliability of each of the at least one modified area (e.g., 701, 702, 703, 704, 705, 706, and 707) included in the inference image 700, calculating the effective area. For example, among the modified areas (e.g., 704, 705, 706, and 707) of FIG. 7 corresponding to the hole areas 626 and 627 of FIG. 6, the electronic device 101 may determine that the reliability of the areas (e.g., 704 and 705) close to the area including image information in the first basic extended image 610 of FIG. 6 is higher than a preset reference value and determine that the reliability of areas (e.g., 706 and 707) relatively far from the area including image information in the first basic extended image 610 of FIG. 6 is lower than the preset reference value. For example, the electronic device 101 may determine an area whose inference reliability is higher than the preset reference value in the inference image 700 as the effective area. The method of determining the inference reliability by the electronic device 101 is merely an example, and a method of determining the inference reliability for each masking area by the electronic device 101 is not limited. According to an embodiment, the electronic device 101 may classify the area, other than the masking area, as an effective area without separately determining the inference reliability thereof or may determine that the inference reliability of the area, other than the masking area, is the maxim value and classify it as an effective area. Or, the electronic device 101 may identify the area, other than the masking area, as an effective area without any separate process of classifying as an effective area. For example, the electronic device 101 may calculate the reliability for all of the pixels in the inference image (e.g., the inference image 700). For example, the electronic device 101 may identify whether all of the areas of the inference image (e.g., the inference image 700) are effective based on the reliability calculated for all of the pixels of the inference image (e.g., the inference image 700).

Figure 8:
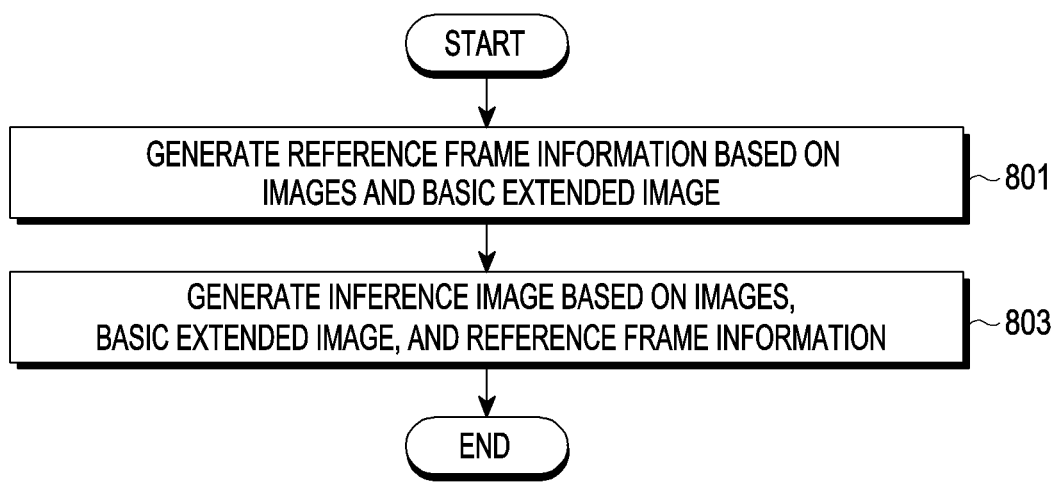
FIG. 8 is a flowchart illustrating operations of an electronic device according to an embodiment of the disclosure.

FIG. 8 is a flowchart illustrating operations of an electronic device according to an embodiment of the disclosure. FIG. 8 is described with reference to FIG. 9.

FIG. 9 is a view illustrating an operation method of an electronic device according to an embodiment of the disclosure.

Referring to FIG. 8, in operation 801, according to various embodiments, the electronic device 101 (e.g., the processor 120 and/or a separate MCU (not shown)) may generate reference frame information (e.g., 941, 942, and 943) based on a basic extended image (e.g., 931, 932, or 933 of FIG. 9) and basic images (e.g., 911, 912, 913, 914, and 915) used to generate the basic extended image.

For example, referring to FIG. 9, the electronic device 101 may obtain basic images (e.g., the first image 911, the second image 912, the third image 913, the fourth image 914, and the fifth image 915) and stabilize the basic images (921, 922, 923, 924, and 925). For example, the electronic device 101 may generate basic extended images 931, 932, and 933 based on the stabilized basic images 921, 922, 923, 924, and 925. For example, referring to FIG. 9, a first basic extended image 931 may be generated based on the first image 911, the second image 912, and the third image 913, a second basic extended image 932 may be generated, based on the second image 912, the third image 913, and the fourth image 914, and a third basic extended image 933 may be generated based on the third image 913, the fourth image 914, and the fifth image 915. For example, that the first basic extended image 931 is generated based on the first image 911, the second image 912, and the third image 913 may mean that the electronic device 101 may generate the first basic extended image 931 by stabilizing (921, 922, and 923) and then overlaying the first image 911, the second image 912, and the third image 913. For example, the electronic device 101 may generate first reference frame information 941 based on the first image 911, the second image 912, the third image 913, and the first basic extended image 931. For example, the first reference frame information 941 may include information about which image of the first image 911, the second image 912, and the third image 913 each area of the first basic extended image 931 corresponds to. For example, the first reference frame information 941 may include information indicating that three basic images (e.g., the first image 911, the second image 912, and the third image 913) are used to generate the first basic extended image 931. For example, the first reference frame information 941 may include information about the area free of image information from the first basic extended image 931. The second reference frame information 942 and the third reference frame information 943 may also be understood in a similar manner.

In operation 803, according to various embodiments, the electronic device 101 may generate inference images based on a basic extended image (e.g., 931, 932, or 933 of FIG. 9), basic images (e.g., 911, 912, 913, 914, and 915) used to generate the basic extended image, and reference frame information (e.g., 941, 942, and 943 of FIG. 9).

Referring to FIG. 9, for example, the electronic device 101 may generate a first inference image based on the first image 911, the second image 912, the third image 913, the first basic extended image 931, and the first reference frame information 941. For example, the electronic device 101 may generate a second inference image based on the second image 912, the third image 913, the fourth image 914, the second basic extended image 932, and the second reference frame information 942. For example, the electronic device 101 may generate a third inference image based on the third image 913, the fourth image 914, the fifth image 915, the third basic extended image 933, and the third reference frame information 943. A method for the electronic device 101 to generate an inference image may be understood similarly to operation 507 of FIG. 5.

Figure 10:
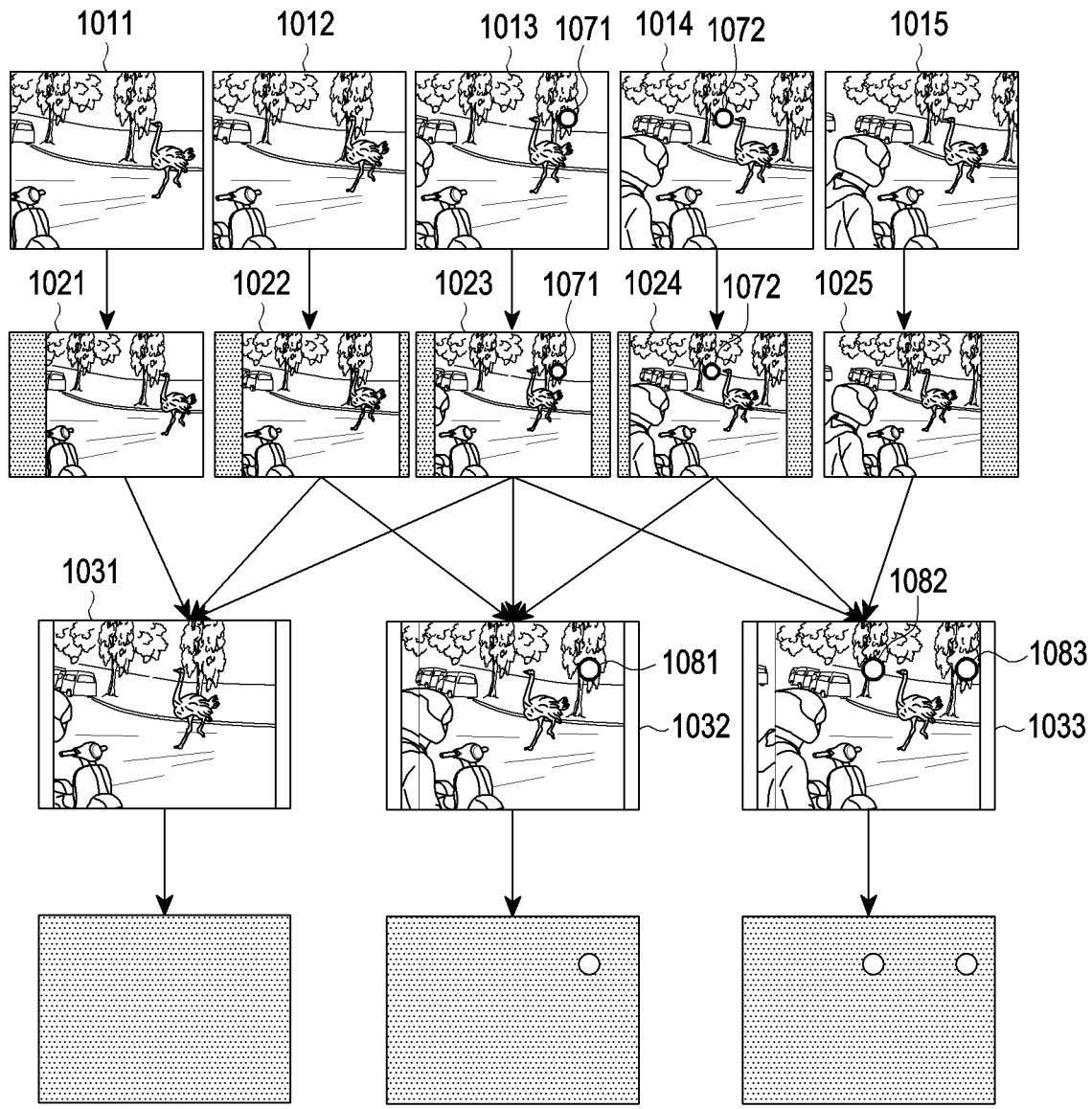
FIG. 10 is a view illustrating operations of an electronic device according to an embodiment of the disclosure.

FIG. 10 is a view illustrating operations of an electronic device according to an embodiment of the disclosure.

Referring to FIG. 10, according to an embodiment, the electronic device 101 may detect a fast moving object from an obtained image.

For example, in FIG. 10, the electronic device 101 may obtain images (e.g., a first image 1011, a second image 1012, a third image 1013, a fourth image 1014, and/or a fifth image 1015) and apply a stabilization algorithm to the obtained images to thereby stabilize them (e.g., 1021, 1022, 1023, 1024, and 1025). In this case, a first object 1071 may be included in a first position of the third image 1013 among the images obtained by the electronic device 101, and a second object 1072 may be included in a second position of the fourth image 1014. For example, the first object 1071 and the second object 1072 may be the same object and may be an object (e.g., a baseball) quickly passing in front of the device having captured the images (e.g., the first image 1011, the second image 1012, the third image 1013, the fourth image 1014, and/or the fifth image 1015). According to an embodiment, the electronic device 101 may obtain difference images between the stabilized images (e.g., 1021, 1022, 1023, 1024, and 1025) or calculate an optical flow to thereby detect the position of a pixel with a large variation. For example, in FIG. 10, the electronic device 101 may generate at least one basic extended image (e.g., the first basic extended image 1031, the second basic extended image 1032, and the third basic extended image 1033) based on at least one stabilized image (e.g., 1021, 1022, 1023, 1024, and/or 1025). For example, the second basic extended image 1032 may include a first object 1081 corresponding to the first object 1071 included in the third image 1013 but may not include an object corresponding to the second object 1072 included in the fourth image 1024. This is why during the process of generating the second basic extended image 1032, all of the areas of the fourth image 1024 are not included in the second basic extended image 1032. For example, the baseballs captured in the prior and post frames may partially overlap and be included in the third basic extended image 1033. For example, the third basic extended image 1033 may include both a first object 1083 corresponding to the first object 1071 included in the third image 1013 and a second object 1082 corresponding to the second object 1072 included in the fourth image 1024. In this case, according to an embodiment, the electronic device 101 may determine that the second object 1082 corresponding to the second object 1072 included in the fourth image 1024 corresponding to the reference frame during the process of generating the third basic extended image 1033 is an effective object and that the first object 1083 corresponding to the first object 1071 included in the third image 1023 corresponding to the prior frame is an ineffective object. For example, the electronic device 101 may determine that the first object 1083 is an artifact.

Figure 11:
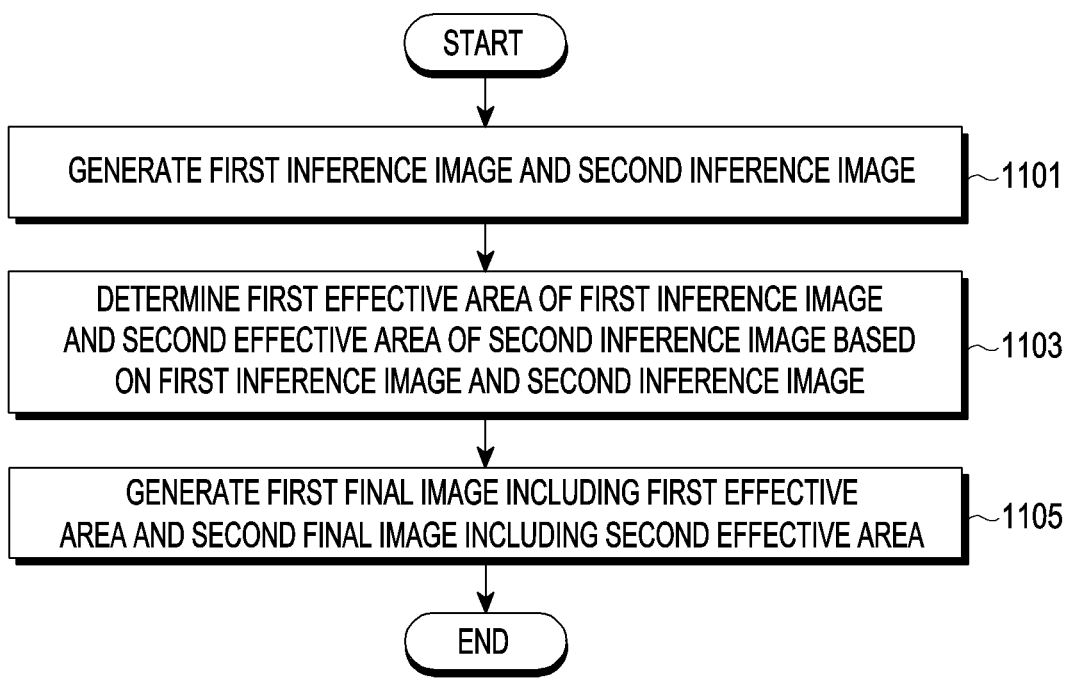
FIG. 11 is a flowchart illustrating operations of an electronic device according to an embodiment of the disclosure.

FIG. 11 is a flowchart illustrating operations of an electronic device according to an embodiment of the disclosure. FIG. 11 is described with reference to FIG. 12.

Figure 12:
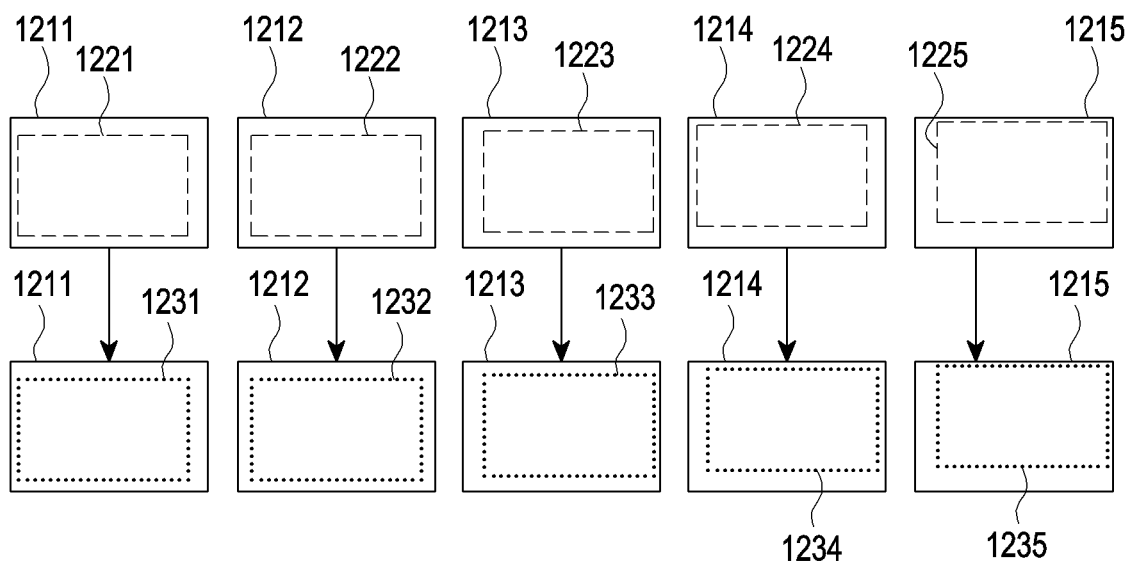
FIG. 12 is a view illustrating operations of an electronic device according to an embodiment of the disclosure.

FIG. 12 is a view illustrating an operation method of an electronic device according to an embodiment of the disclosure.

Referring to FIG. 11, in operation 1101, according to various embodiments, an electronic device 101 (e.g., the processor 120 and/or a separate MCU (not shown)) may generate a plurality of inference images. For example, referring to FIG. 12, the electronic device 101 may generate a first inference image 1211, a second inference image 1212, a third inference image 1213, a fourth inference image 1214, and a fifth inference image 1215.

Thereafter, according to an embodiment, the electronic device 101 may calculate the reliability (e.g., inference reliability) for all of the pixels of each inference image (e.g., the first inference image 1211, the second inference image 1212, the third inference image 1213, the fourth inference image 214, and the fifth inference image 1215. Accordingly, the electronic device 101 may identify the maximum-reliability area from each inference image (e.g., the first inference image 1211, the second inference image 1212, the third inference image 1213, the fourth inference image 1214, and the fifth inference image 1215). The maximum-reliability area may mean an area with the maximum average reliability when the average reliability included in the corresponding area is calculated based on the reliabilities of all of the pixels of each inference image. For example, in FIG. 12, the electronic device 101 may identify that the first area 1221 in the first inference image 1211 is the maximum-reliability area, identify that the second area 1222 in the second inference image 1212 is the maximum-reliability area, identify that the third area 1223 in the third inference image 1213 is the maximum-reliability area, identify that the fourth area 1224 in the fourth inference image 1214 is the maximum-reliability area, and identify that the fifth area 1225 in the fifth inference image 1215 is the maximum-reliability area. However, when an image is generated based on each maximum-reliability area, the reliability of individual frames themselves may be high, but the effect of image stabilization may disappear, with the result of severe image shakes.

In operation 1103, according to various embodiments, the electronic device 101 may determine an effective area of each inference image based on a plurality of inference images.

According to an embodiment, referring to FIG. 12, the electronic device 101 may determine each optimized area, described below, as each effective area. For example, referring to FIG. 12, the electronic device 101 may identify the optimized area of each inference image based on the plurality of inference images for which the maximum-reliability area has been identified. The optimized area may mean an area in which the path has been optimized so that frame shakes are minimized and are thus smoothly connected in a case where an image is generated using a plurality of frames based on the maximum-reliability areas in the prior frame and the post frame. For example, the electronic device 101 may determine a first optimized area 1231 of the first inference image 1211, a second optimized area 1232 of the second inference image 1212, a third optimized area 1233 of the third inference image 1213, a fourth optimized area 1234 of the fourth inference image 1214, and a fifth optimized area 1235 of the fifth inference image 1215 by performing path optimization based on the first area 1221, which is the maximum-reliability area of the first inference image 1211, the second area 1222, which is the maximum-reliability area of the second inference image 1212, the third area 1223, which is the maximum-reliability area of the third inference image 1213, the fourth area 1224, which is the maximum-reliability area of the fourth inference image 1214, and the fifth area 1225, which is the maximum-reliability area of the fifth inference image 1215. For example, the image generated based on the first optimized area 1231, the second optimized area 1232, the third optimized area 1233, the fourth optimized area 1234, and the fifth optimized area 1235 may be an image with minimized frame shakes. In this case, according to an embodiment, the electronic device 101 may determine that each of the first optimized area 1231, the second optimized area 1232, the third optimized area 1233, the fourth optimized area 1234, and the fifth optimized area 1235 is an effective area.

In operation 1105, according to various embodiments, the electronic device 101 may generate a first final image based on the first optimized area 1231 (e.g., a first effective area), a second final image based on the second optimized area 1232 (e.g., a second effective area), a third final image based on the third optimized area 1233 (e.g., a third effective area), a fourth final image based on the fourth optimized area 1234 (e.g., a fourth effective area), and a fifth final image based on the fifth optimized area 1235 (e.g., a fifth effective area). For example, that the electronic device 101 generates a final image based on an optimized area (e.g., an effective area) may mean generating a final image that includes the whole or at least part of the optimized area (e.g., effective area). Thereafter, the electronic device 101 may render an image with an extended angle of view based on the plurality of generated final images.

Figure 13:
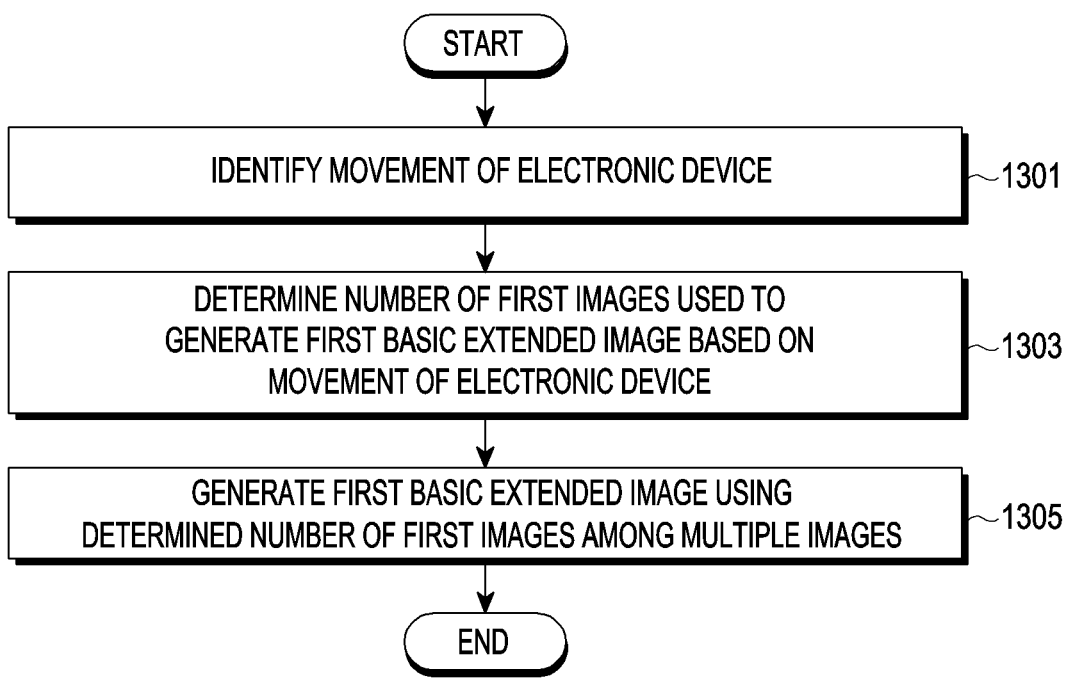
FIG. 13 is a flowchart illustrating operations of an electronic device according to an embodiment of the disclosure.

FIG. 13 is a flowchart illustrating operations of an electronic device according to an embodiment of the disclosure. FIG. 13 is described with reference to FIGS. 14 and 15.

Figure 14:
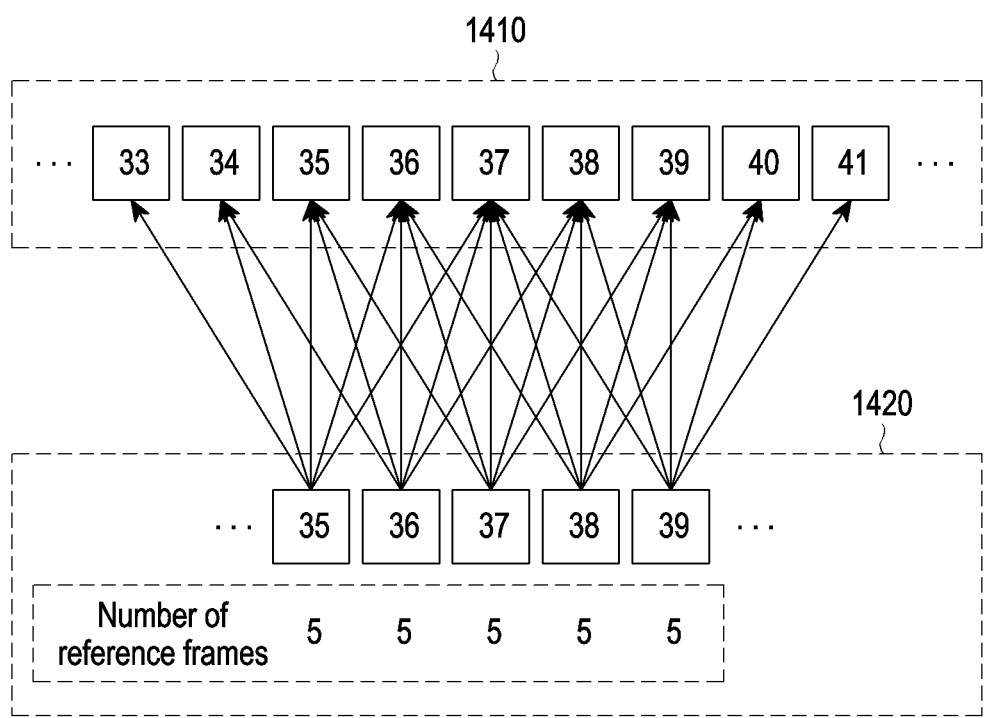
FIG. 14 is a view illustrating operations of an electronic device according to an embodiment of the disclosure.

FIG. 14 is a view illustrating an operation method of an electronic device according to an embodiment of the disclosure.

Figure 15:
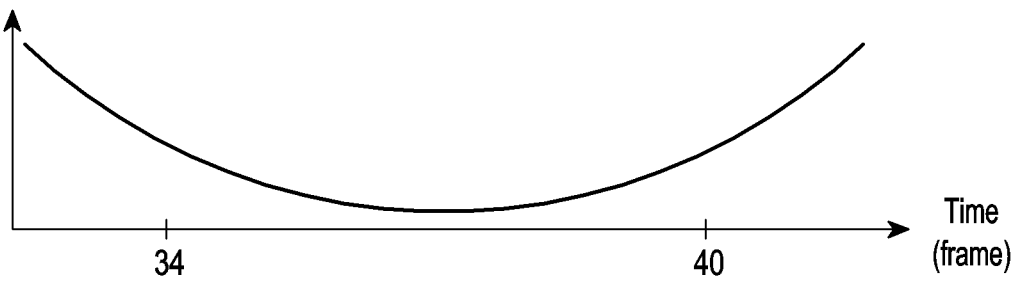
FIG. 15 is a view illustrating operations of an electronic device according to an embodiment of the disclosure.
Figure 15:
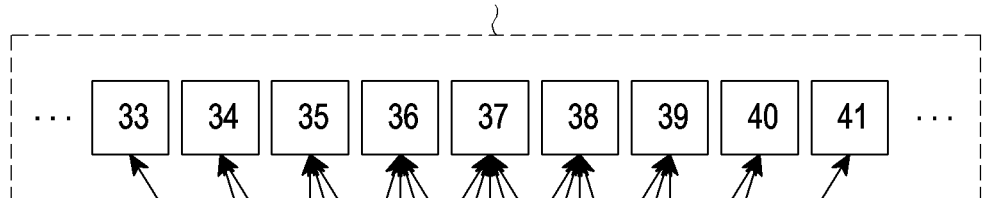
Figure 15:
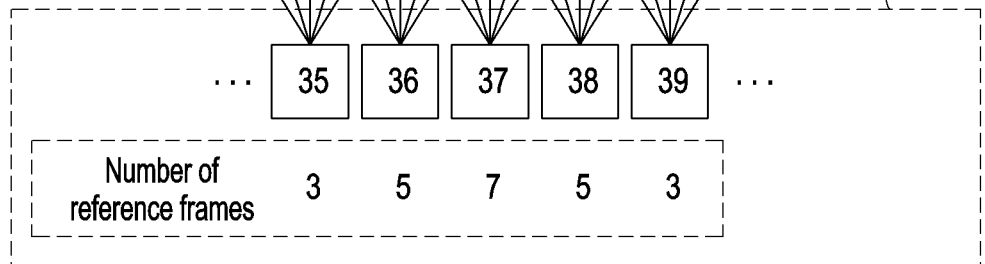

FIG. 15 is a view illustrating an operation method of an electronic device according to an embodiment of the disclosure.

Referring to FIG. 13, in operation 1301, according to various embodiments, the electronic device 101 (e.g., the processor 120 and/or a separate MCU (not shown)) may identify a movement of a device (e.g., the electronic device 101) having an original image. For example, the electronic device 101 may identify the movement of the electronic device 101 based on sensing information about movement and/or the position of the electronic device 101 at the time of capturing the original image and a result of analysis of the original image. Hereinafter, for convenience of description, it is assumed that the electronic device 101 captures the original image. However, this is merely an example. Even when an external device (not shown), not the electronic device 101, captures the original image, it may be understood similarly to the description of the embodiment in which the electronic device 101 captures the original image.

In operation 1303, according to various embodiments, the electronic device 101 may determine the number of basic images (e.g., first images) used to generate one basic extended image (e.g., first basic extended image) based on the movement of the electronic device 101.

In operation 1305, according to various embodiments, the electronic device 101 may generate one basic extended image (e.g., first basic extended image) using the determined number of basic images (e.g., first images) among multiple basic images (e.g., multiple images).

For example, FIG. 14 illustrates an embodiment in which a fixed number of basic images are used to generate one basic extended image based on there being no change in the movement of the electronic device 101 or a variation in movement being a predetermined level or less. In FIG. 14, reference numeral 1410 denotes a plurality of basic extended images, and 1420 denotes a plurality of basic images. For example, referring to FIG. 14, at the time of capturing the original image, the electronic device 101 may keep constant the number of basic images used to generate one basic extended image, based on the variation in the movement of the electronic device 101 being a predetermined level or less, such as when the electronic device 101 is fixed and is not moved (e.g., when the electronic device 101 is fixed to a tripod), or when the electronic device 101 moves at constant speed or when the electronic device 101 rotates at constant speed (e.g., when the electronic device 101 pans to the right at constant speed, fixed to a tripod). In this case, the number of basic images used to generate one basic extended image may be set to a predesignated value (e.g., 5) or may be calculated as a value proportional to the moving speed of the electronic device 101 at the time of capturing the original image, but this is merely an example. A method of calculating the number of basic images used to generate one basic extended image is not limited thereto. FIG. 14 illustrates use of five reference frames (i.e., five basic images) to generate one basic extended image. For example, the electronic device 101 may use five images (e.g., a $35^{th}$ image, a $36^{th}$ image, a $37^{th}$ image, a $38^{th}$ image, and a $39^{th}$ image) with respect to the $37^{th}$ basic image to generate a $37^{th}$ basic extended image.

As another example, FIG. 15 illustrates an example in which the number of basic images used to generate one basic extended image is varied per frame based on the variation in the movement of the electronic device 101 exceeding a predetermined level. In FIG. 15, reference numeral 1510 denotes a plurality of basic extended images, and 1520 denotes a plurality of basic images. For example, referring to FIG. 15, the size of the movement of the electronic device 101 may vary in excess of a predetermined level at the time of capturing the original image. For example, referring to the graph of FIG. 15, the moving speed of the electronic device 101 may gradually reduce before the $37^{th}$ frame and, thereafter, the moving speed of the electronic device 101 may gradually increase. According to an embodiment, the electronic device 101 may determine the number of basic images used to generate the nth basic extended image based on the moving speed of the electronic device 101 at the time of capturing the nth image. For example, the electronic device 101 may increase the number of reference frames as the moving speed reduces. For example, in FIG. 15, the electronic device 101 may determine that the number of basic images used to generate the $37^{th}$ basic extended image is 7 based on the moving speed of the electronic device 101 at the time of capturing the $37^{th}$ image. For example, the electronic device 101 may determine that the number of basic images used to generate the $38^{th}$ basic extended image is 5, which is smaller than the number, e.g., 7, of basic images used to generate the $37^{th}$ basic extended image, based on the moving speed of the electronic device 101 at the time of capturing the $38^{th}$ image being larger than the moving speed of the electronic device 101 at the time of capturing the $37^{th}$ image.

According to another embodiment, the electronic device 101 may adjust the number of prior/post frames referenced to minimize the variation in the size of the basic extended image generated corresponding to each frame. For example, when the second basic extended image corresponding to the second frame is generated using the first frame, the second frame, and the third frame, the size of the second basic extended image may be determined based on the first frame, the second frame, and the third frame. Thereafter, the electronic device 101 may determine the size of the third basic extended image corresponding to the third frame based on the size of the pre-generated second basic extended image. For example, the electronic device 101 may determine the size of the third basic extended image so that the difference between the size of the third basic extended image and the size of the second basic extended image does not exceed a preset value. Accordingly, the electronic device 101 may determine the number of basic images used to generate the third basic extended image based on the size of the third basic extended image. For example, the electronic device 101 may increase the number of frames referenced, until the size of the basic extended image (e.g., the third basic extended image) generated corresponding to the current frame (e.g., the third frame) becomes similar to the size of the basic extended image (e.g., the second basic extended image) generated corresponding to the prior frame (e.g., the second frame). For example, in a case where the third basic extended image is generated using three basic images (e.g., the second frame, the third frame, and the fourth frame), if the difference between the size of the second basic extended image and the size of the third basic extended image exceeds a preset value, the electronic device 101 may increase the number of reference frames, generating the third basic extended image using five basic images (e.g., the first frame, the second frame, the third frame, the fourth frame, and the fifth frame).

Figure 16:
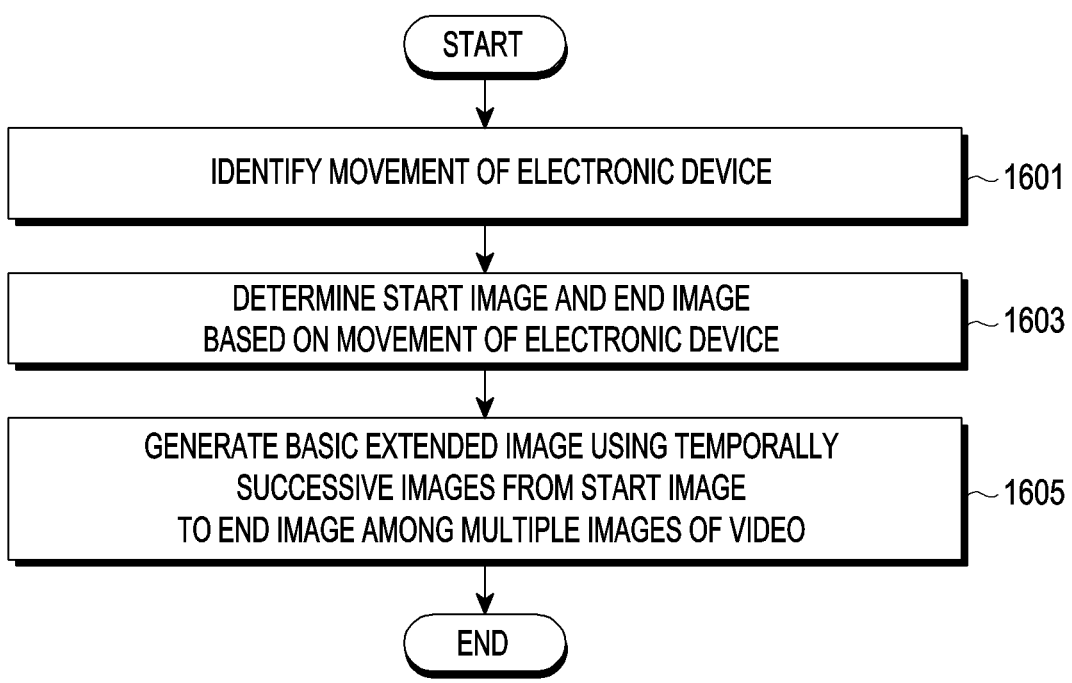
FIG. 16 is a flowchart illustrating operations of an electronic device according to an embodiment of the disclosure.

FIG. 16 is a flowchart illustrating operations of an electronic device according to an embodiment of the disclosure. FIG. 16 is described with reference to FIGS. 17 and 18.

Figure 17:
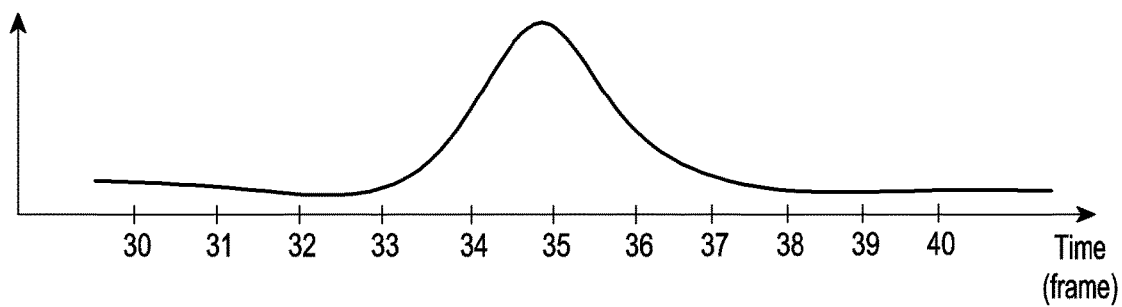
FIG. 17 is a view illustrating operations of an electronic device according to an embodiment of the disclosure.
Figure 17:
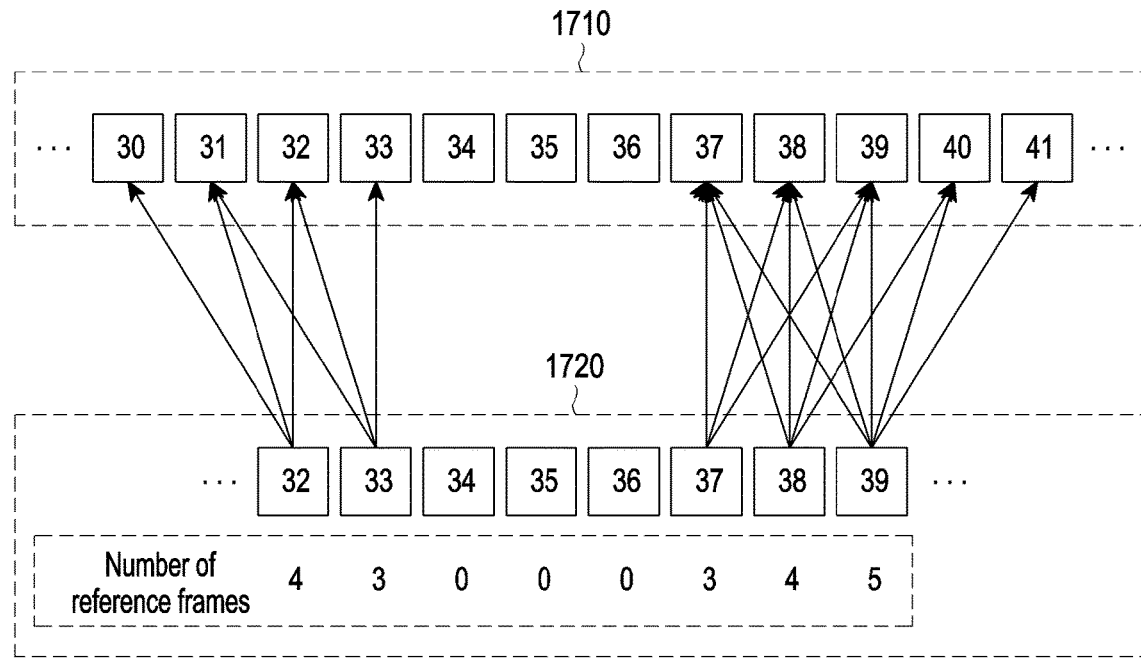

FIG. 17 is a view illustrating operations of an electronic device according to an embodiment of the disclosure.

Figure 18:
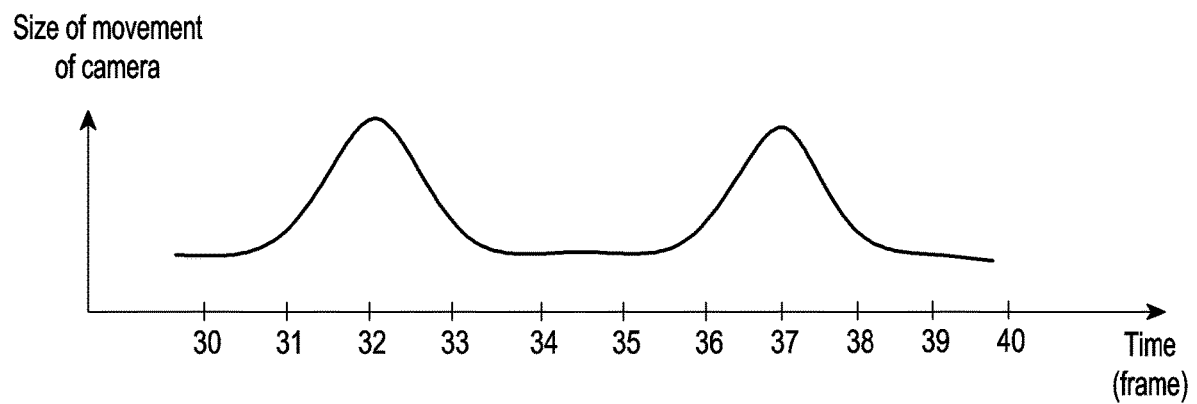
FIG. 18 is a view illustrating operations of an electronic device according to an embodiment of the disclosure.

FIG. 18 is a view illustrating operations of an electronic device according to an embodiment of the disclosure.

Referring to FIG. 16, in operation 1601, according to various embodiments, the electronic device 101 (e.g., the processor 120 and/or a separate MCU (not shown)) may identify a movement of a device (e.g., the electronic device 101) having an original image. Operation 1601 may be understood in a similar manner to operation 1301.

In operation 1603, according to various embodiments, the electronic device 101 may determine a start image and an end image based on a movement of the electronic device 101. The start image may mean an image which serves as a start point of one video. The end image may mean an image which serves as an end point of one video.

In operation 1605, according to various embodiments, the electronic device 101 may generate a basic extended image using temporally successive basic images from the start image to the end image among multiple basic images of the video.

According to an embodiment, when the start image and the end image are determined, the electronic device 101 may generate one video using a plurality of successive images from the start image to the end image. A relevant embodiment is described below with reference to FIG. 17.

According to another embodiment, when a first start image and a first end image are determined, and a second start image and a second end image are determined, the electronic device 101 may generate a first video using a plurality of successive images from the first start image to the first end image and generate a second video using a plurality of successive images from the second start image to the second end image. In this case, the plurality of successive images from the image immediately following the first end image to the image immediately preceding the second start image may not be used to generate a video. Generating a plurality of videos in such a manner may be defined as separating and generating a video. In this case, the plurality of successive images from the image immediately following the first end image to the image immediately preceding the second start image may be named video separation points.

In FIG. 17, reference numeral 1710 denotes a plurality of basic extended images, and 1720 denotes a plurality of basic images. For example, in FIG. 17, the electronic device 101 (e.g., the processor 120 and/or a separate MCU (not shown)) may determine the 33rd frame as the first end image and determine the 37th frame as the second start image. For example, the electronic device 101 may generate a first video using the images up to the 33rd frame and generate a second video using the images starting from the 37th frame. This is described in detail with reference to FIG. 17. For example, referring to FIG. 17, as described above in connection with FIG. 15, the electronic device 101 may determine the number of reference frames based on the size of the movement of the electronic device 101. For example, the electronic device 101 may determine that the number of reference frames used to generate the 34th basic extended image, the 35th basic extended image, and the 36th basic extended image is 0. This may be based on the size of the movement of the electronic device when capturing the 34th frame, 35th frame, and 36th frame exceeding a preset reference value, but this is merely an example, and is not limited thereto. According to an embodiment, when the number of reference frames used to generate the 34th basic extended image, 35th basic extended image, and 36th basic extended image is determined to be 0, the electronic device 101 may not generate the 34th basic extended image, 35th basic extended image, and 36th basic extended image. For example, the electronic device 101 may generate a basic extended image corresponding to frames for which the number of reference frames is not 0. Referring to FIG. 17, for example, the electronic device 101 may determine that the number of reference frames used to generate the 33rd basic extended image corresponding to the 33rd frame is 3 so that the electronic device 101 may generate the 33rd basic extended image using the 31st frame, 32nd frame, and 33rd frame. In this case, the reason why the 34th frame is not used may be because the 34th frame and the immediately subsequent 35th and 36th frames are determined not to be used to generate the video (or image). For example, the electronic device 101 may determine that the 34th frame, 35th frame, and 36th frame are not used to generate a video (or image) based on the size of the movement of the electronic device 101 at the time of capturing the 34th frame, 35th frame, and 36th frame exceeding a preset reference value. As such, according to an embodiment, the electronic device 101 may determine whether to use a designated frame in generating a video (or image) and the number of reference frames used to generate a video (or image) based on the size of the movement of the device (e.g., the electronic device 101) having captured the original image.

According to an embodiment, referring to FIG. 18, the electronic device 101 (e.g., the processor 120 and/or a separate MCU (not shown)) may determine that the 32nd frame is not used in generating a video (or image) based on the size of the movement of the electronic device 101 at the time of capturing the 32nd frame (e.g., a first time) exceeding a preset reference value. For example, the electronic device 101 may determine that the 37th frame is not used in generating a video (or image) based on the size of the movement of the electronic device 101 at the time of capturing the 37th frame (e.g., a second time) exceeding a preset reference value. Accordingly, the electronic device 101 may determine the 33rd frame, which is the frame obtained next to the 32nd frame corresponding to the first time, as the start image and may determine that the 36th frame, which is the frame obtained before the 37th frame corresponding to the second time, as the end image. As a result, the electronic device 101 may generate one image (or video) using successive images from the 33rd frame, as the start image, to the 36th frame, as the end image.

According to various embodiments, an electronic device 101 may comprise at least one processor (e.g., the processor 120 or a separate MCU); and a memory 130 functionally connected to the at least one processor. The memory may store instructions that are configured to, when executed, enable the electronic device to obtain a plurality of images, generate a first basic extended image based on first images among the plurality of images, identify at least one first masking area included in the first basic extended image, and generate a first inference image by modifying the at least one first masking area using at least one first inference result, based on the first images and the first basic extended image. An angle of view of the first inference image may be larger than an angle of view of each of the first images.

According to various embodiments, the instructions may be further configured to enable the electronic device to determine a number of the first images used to generate the first basic extended image.

According to various embodiments, the instructions may be further configured to enable the electronic device to identify a movement of the electronic device using the plurality of images and determine the number of the first images used to generate the first basic extended image, based on the movement.

According to various embodiments, the electronic device may further comprise at least one sensor (e.g., the sensor module 176). The instructions may be further configured to enable the electronic device to obtain first sensing information using the at least one sensor, identify a movement of the electronic device based on the first sensing information, and determine the number of the first images used to generate the first basic extended image, based on the movement.

According to various embodiments, the instructions may be further configured to enable the electronic device to generate the first basic extended image using a predetermined number of the first images, based on the movement of the electronic device being included in a preset first range.

According to various embodiments, the instructions may be further configured to enable the electronic device to generate the first basic extended image using a determined number of the first images, the determined number being determined based on a speed of the movement of the electronic device.

According to various embodiments, the determined number is determined based on the speed of the movement of the electronic device at a time at which a particular first image was captured.

According to various embodiments, the instructions may be further configured to enable the electronic device to generate first reference frame information, based on the first images and the first basic extended image and generate the first inference image, based on the first images, the first basic extended image, and the first reference frame information. The first reference frame information may include information about each image corresponding to each pixel included in the first basic extended image among the first images.

According to various embodiments, the at least one first masking area may include a first hole area not including information about a pixel included in the first images.

According to various embodiments, the first hole area corresponds to a moving object in at least one of the first images.

According to various embodiments, the instructions may be further configured to enable the electronic device to generate a second basic extended image and second reference frame information using second images including at least some of the first images among the plurality of images, identify at least one second masking area included in the second basic extended image, generate a second inference image resultant from modifying the at least one second masking area using at least one second inference result, based on the second images, the second basic extended image, and the second reference frame information, determine a first effective area of the first inference image and a second effective area of the second inference image, based on the first inference image and the second inference image, and generate a first final image including the first effective area and a second final image including the second effective area.

According to various embodiments, the first images may include a first start image, a first end image, and temporally successive images from the first start image to the first end image. The instructions may be further configured to enable the electronic device to identify a movement of the electronic device and determine the first start image and the first end image, based on the movement.

According to various embodiments, the instructions may be further configured to enable the electronic device to identify a first time and a second time when a size of the movement of the electronic device exceeds a reference value and determine an image, immediately following an image corresponding to the first time, as the first start image and an image, immediately preceding an image corresponding to the second time, as the first end image.

According to various embodiments, an electronic device 101 may comprise at least one camera (e.g., the camera module 180) and at least one processor (e.g., the processor 120 or a separate MCU) operably connected with the at least one camera, wherein the at least one processor is configured to obtain a plurality of images using the at least one camera, stabilize the plurality of images using a stabilization algorithm, generate a plurality of basic extended images by overlaying some images of the plurality of stabilized images, generate a plurality of inference images resultant from modifying the plurality of basic extended images using an inference model, and generate a final video with a larger angle of view than an angle of view of each of the plurality of images, based on the plurality of inference images.

According to various embodiments, the at least one processor may be further configured to determine a number of images used to generate each of the plurality of basic extended images.

According to various embodiments, the at least one processor may be further configured to identify a movement of the electronic device using the plurality of images and determine the number of the images used to generate each of the plurality of basic extended images, based on the movement.

According to various embodiments, the electronic device may further comprise at least one sensor (e.g., the sensor module 176). The at least one processor may be further configured to obtain first sensing information using the at least one sensor, identify a movement of the electronic device based on the first sensing information, and determine the number of the images used to generate each of the plurality of basic extended images, based on the movement.

According to various embodiments, the at least one processor may be further configured to generate the plurality of basic extended images using a predetermined number of the images, based on the movement of the electronic device being included in a preset first range.

According to various embodiments, the at least one processor may be further configured to generate reference frame information corresponding to each of the plurality of basic extended images, based on the plurality of basic extended images and basic images used to generate the plurality of basic extended images and generate a plurality of inference images respectively corresponding to the plurality of basic extended images, based on the plurality of basic extended images, the basic images, and the reference frame information. Each of the plurality of inference images may include information about each image corresponding to each pixel included in each of the plurality of basic extended images among the basic images.

According to various embodiments, each of the plurality of basic extended images may include at least one masking area. The at least one masking area may include a hole area not including information about a pixel included in basic images used to generate the plurality of basic extended images.

According to various embodiments, the at least one processor may be further configured to determine an effective area included in each of the plurality of inference images, based on the plurality of inference images and generate the final video using a plurality of final images including the effective area.

According to various embodiments, each of basic images used to generate the plurality of basic extended images may include a start image, an end image, and temporally successive images from the start image to the end image. The at least one processor may be further configured to identify a movement of the electronic device and determine the start image and the end image, based on the movement.

According to various embodiments, the at least one processor may be further configured to identify a plurality of times when a size of the movement of the electronic device exceeds a reference value and determine the start image and the end image, based on the plurality of times.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
at least one processor; and
memory,
storing instructions that, when executed by the at least one processor, cause the electronic device to:
obtain a plurality of images,
generate a first basic extended image based on first images among the plurality of images,
identify at least one first masking area included in the first basic extended image, and
generate a first inference image by modifying the at least one first masking area using at least one first inference result, based on the first images and the first basic extended image, and
wherein an angle of view of the first inference image is larger than an angle of view of each of the first images,
wherein the first images include a first start image, a first end image, and temporally successive images from the first start image to the first end image, and
wherein the instructions, when executed by the at least one processor, further cause the electronic device to:
identify a movement of the electronic device,
identify a first time and a second time when a size of the movement of the electronic device exceeds a reference value, and
determine the first start image and the first end image, based on the first time and the second time.

2. The electronic device of claim 1, wherein the instructions, when executed by the at least one processor, further cause the electronic device to:
determine a number of the first images used to generate the first basic extended image.

3. The electronic device of claim 2, wherein the instructions, when executed by the at least one processor, further cause the electronic device to:
identify a movement of the electronic device using the plurality of images, and
determine the number of the first images used to generate the first basic extended image, based on the movement.

4. The electronic device of claim 2, further comprising at least one sensor,
wherein the instructions, when executed by the at least one processor, further cause the electronic device to:
obtain first sensing information using the at least one sensor,
identify a movement of the electronic device based on the first sensing information, and
determine the number of the first images used to generate the first basic extended image, based on the movement.

5. The electronic device of claim 4, wherein the instructions, when executed by the at least one processor, further cause the electronic device to:
generate the first basic extended image using a predetermined number of the first images, based on the movement of the electronic device being included in a preset first range.

6. The electronic device of claim 4, wherein the instructions, when executed by the at least one processor, further cause the electronic device to:
generate the first basic extended image using a determined number of the first images, the determined number being determined based on a speed of the movement of the electronic device.

7. The electronic device of claim 6, wherein the determined number is determined based on the speed of the movement of the electronic device at a time at which a particular first image was captured.

8. The electronic device of claim 1,
wherein the instructions, when executed by the at least one processor, further cause the electronic device to:
generate first reference frame information, based on the first images and the first basic extended image, and
generate the first inference image, based on the first images, the first basic extended image, and the first reference frame information, and
wherein the first reference frame information includes information about each image corresponding to each pixel included in the first basic extended image among the first images.

9. The electronic device of claim 1, wherein the at least one first masking area includes a first hole area not including information about a pixel included in the first images.

10. The electronic device of claim 9, wherein the first hole area corresponds to a moving object in at least one of the first images.

11. The electronic device of claim 1, wherein the instructions, when executed by the at least one processor, further cause the electronic device to:
generate a second basic extended image and second reference frame information using second images including at least some of the first images among the plurality of images,
identify at least one second masking area included in the second basic extended image,
generate a second inference image resultant from modifying the at least one second masking area using at least one second inference result, based on the second images, the second basic extended image, and the second reference frame information,
determine a first effective area of the first inference image and a second effective area of the second inference image, based on the first inference image and the second inference image, and
generate a first final image including the first effective area and a second final image including the second effective area.

12. The electronic device of claim 1, wherein the instructions, when executed by the at least one processor, further cause the electronic device to:
determine an image, immediately following an image corresponding to the first time, as the first start image and an image, immediately preceding an image corresponding to the second time, as the first end image.

13. An electronic device comprising,
at least one camera;
at least one processor operably connected with the at least one camera, and
memory storing instructions that, when executed by the at least one processor, cause the electronic device to:
obtain a plurality of images using the at least one camera,
stabilize the plurality of images using a stabilization algorithm,
generate a plurality of basic extended images by overlaying some images of the plurality of stabilized images,
generate a plurality of inference images resultant from modifying the plurality of basic extended images using an inference model, and
generate a final video with a larger angle of view than an angle of view of each of the plurality of images, based on the plurality of inference images, and
wherein each of basic images used to generate the plurality of basic extended images includes a start image, an end image, and temporally successive images from the start image to the end image, and
wherein the instructions, when executed by the at least one processor, further cause the electronic device to:
identify a movement of the electronic device,
identify a plurality of times when a size of the movement of the electronic device exceeds a reference value, and
determine the start image and the end image, based on the plurality of times.

14. The electronic device of claim 13, wherein the instructions, when executed by the at least one processor, further cause the electronic device to:
determine a number of images used to generate each of the plurality of basic extended images.

15. The electronic device of claim 14, wherein the instructions, when executed by the at least one processor, further cause the electronic device to:
identify a movement of the electronic device using the plurality of images, and
determine the number of the images used to generate each of the plurality of basic extended images, based on the movement.

16. The electronic device of claim 14, further comprising at least one sensor,
wherein the instructions, when executed by the at least one processor, further cause the electronic device to:
obtain first sensing information using the at least one sensor,
identify a movement of the electronic device based on the first sensing information, and
determine the number of the images used to generate each of the plurality of basic extended images, based on the movement.

17. The electronic device of claim 16, wherein the instructions, when executed by the at least one processor, further cause the electronic device to:
generate the plurality of basic extended images using a predetermined number of the images, based on the movement of the electronic device being included in a preset first range.

18. The electronic device of claim 13,
wherein the instructions, when executed by the at least one processor, further cause the electronic device to:
generate reference frame information corresponding to each of the plurality of basic extended images, based on the plurality of basic extended images and basic images used to generate the plurality of basic extended images, and generate a plurality of inference images respectively corresponding to the plurality of basic extended images, based on the plurality of basic extended images, the basic images, and the reference frame information, and wherein each of the plurality of inference images includes information about each image corresponding to each pixel included in each of the plurality of basic extended images among the basic images.

19. The electronic device of claim 13, wherein each of the plurality of basic extended images includes at least one masking area, and wherein the at least one masking area includes a hole area not including information about a pixel included in basic images used to generate the plurality of basic extended images.

20. The electronic device of claim 13, wherein the instructions, when executed by the at least one processor, further cause the electronic device to:

determine an effective area included in each of the plurality of inference images, based on the plurality of inference images, and generate the final video using a plurality of final images including the effective area.

* * * * *